United States Patent [19]

Muramatsu et al.

[11] Patent Number: 4,841,392
[45] Date of Patent: Jun. 20, 1989

[54] TAPE LOADING APPARATUS HAVING AN ARRANGEMENT FOR CONTROLLING MOVEMENT OF A GUIDE ROLLER HOLDER ARM

[75] Inventors: Hidenori Muramatsu; Kimichika Yamada; Katsuya Nozawa; Yoshihiko Goto, all of Tokyo, Japan

[73] Assignee: Clarion Co., Ltd., Tokyo, Japan

[21] Appl. No.: 922,438

[22] Filed: Oct. 23, 1986

[30] Foreign Application Priority Data

Oct. 29, 1985 [JP] Japan .................. 60-241852

[51] Int. Cl.[4] .............................. G11B 15/66
[52] U.S. Cl. ........................ 360/85; 360/95
[58] Field of Search .............. 360/85, 95, 130.22, 360/130.23

[56] References Cited

U.S. PATENT DOCUMENTS

| 4,138,699 | 2/1979 | Ura et al. ........................ 360/85 |
| 4,410,919 | 10/1983 | Umeda ........................... 360/85 |
| 4,491,886 | 1/1985 | Saito et al. ....................... 360/85 |
| 4,642,712 | 2/1987 | Kohda ............................ 360/85 |
| 4,642,713 | 2/1987 | Ohira et al. ...................... 360/85 |
| 4,661,864 | 4/1987 | Kuwajima ....................... 360/85 |
| 4,704,644 | 11/1987 | Takenouchi ..................... 360/85 |

FOREIGN PATENT DOCUMENTS 57-50353  3/1982  Japan ................................ 360/85

Primary Examiner—John H. Wolff
Attorney, Agent, or Firm—Flynn, Thiel, Boutell & Tanis

[57] ABSTRACT

A tape player having a rotating drum head such as VTR etc. characterized in that a holder, on which at least a guide roller for the tape is mounted outside of the tape path, is disposed movably between its retreated position, where it doesn't interfere with the loading block and the subblock, and its advanced position, where it fronts on the tape path, and is energized towards its retreated position, that control means controlling the movement of the holder arm towards its advanced position is provided, and that an operating member to operate the control means, after this subblock has passed through a position which is occupied by the guide roller in the advanced position of the holder arm, is disposed on the subblock.

5 Claims, 19 Drawing Sheets

FIG. 5
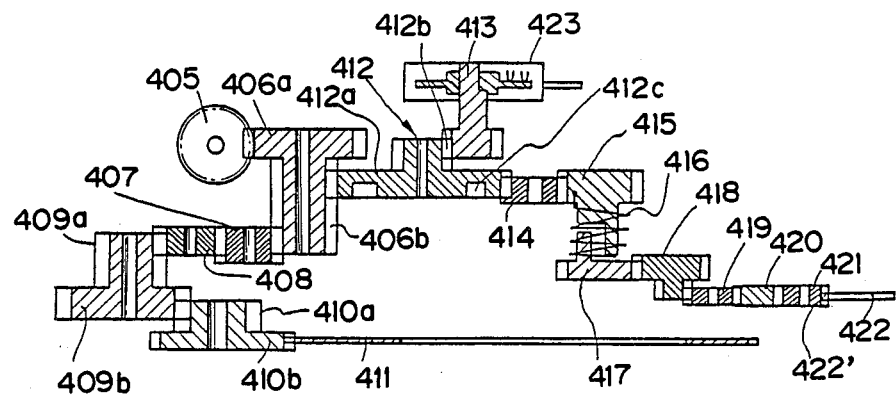
FIG. 6
FIG. 4
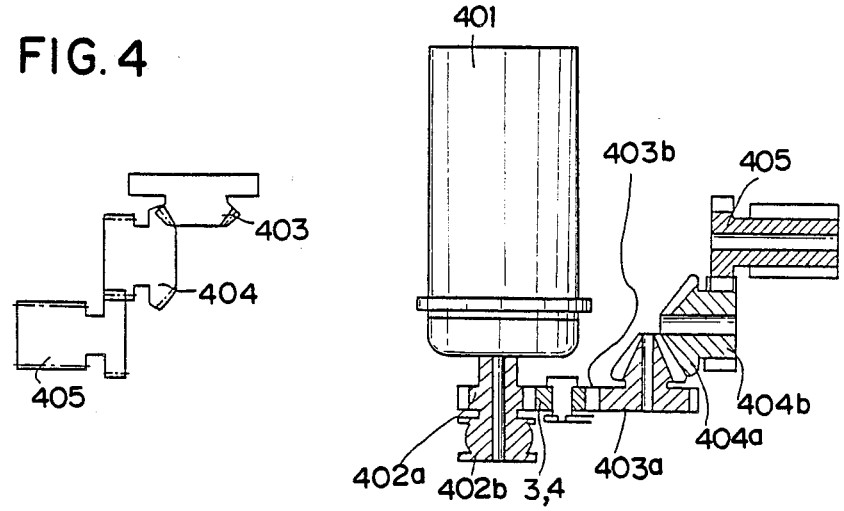

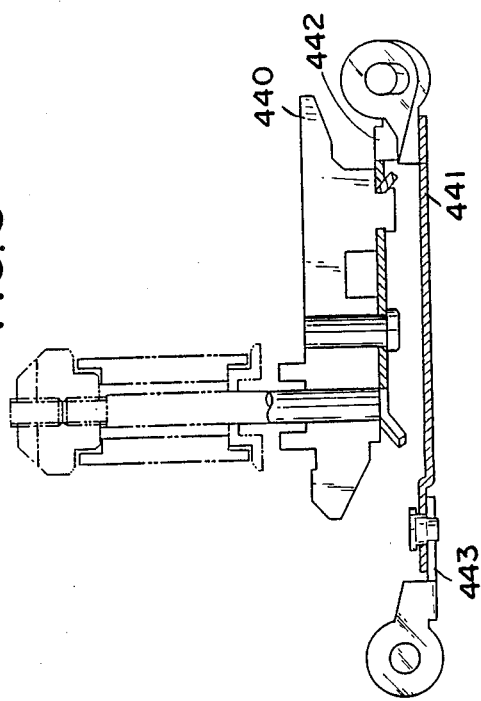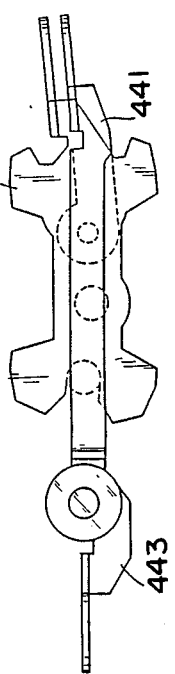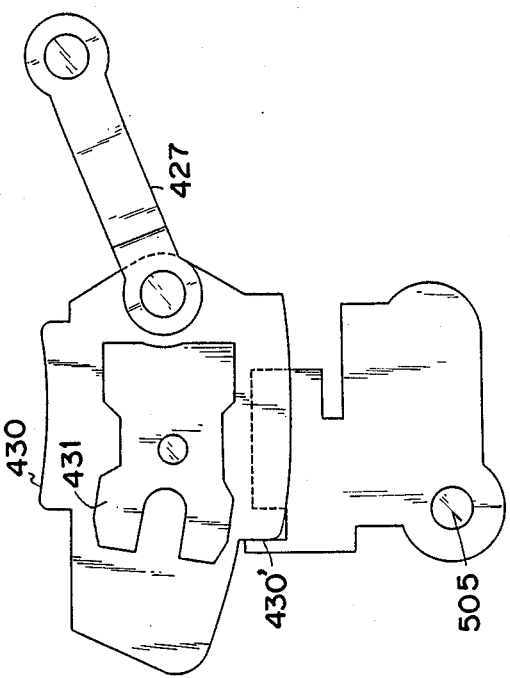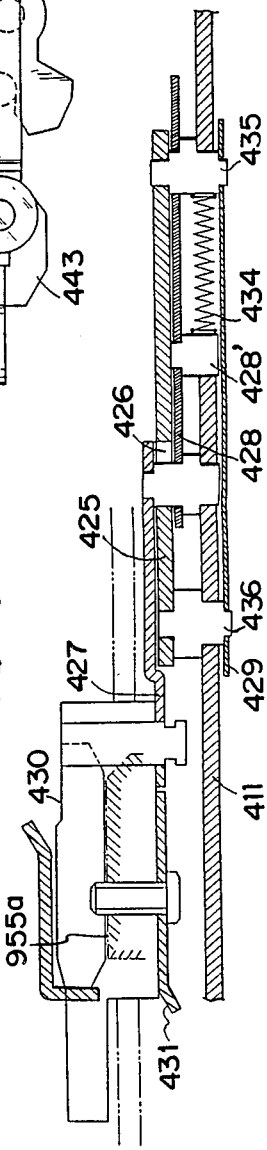

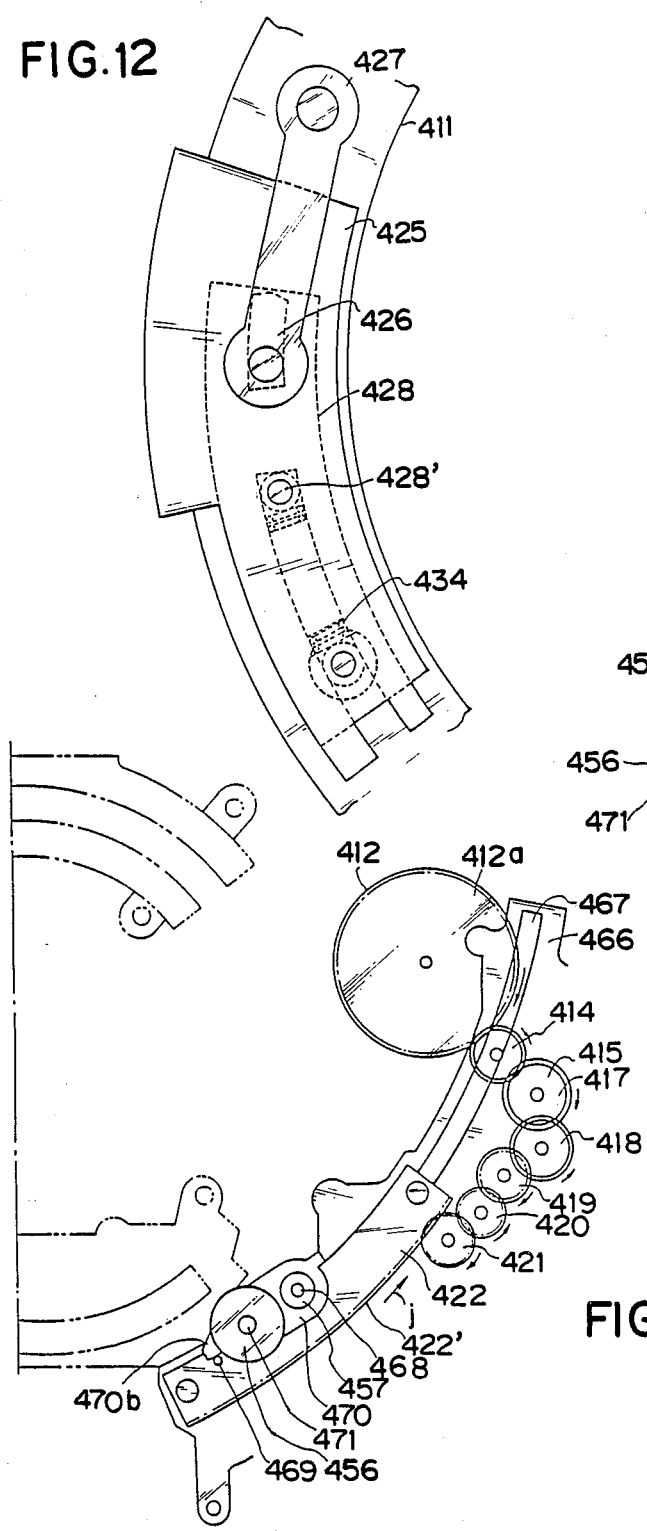
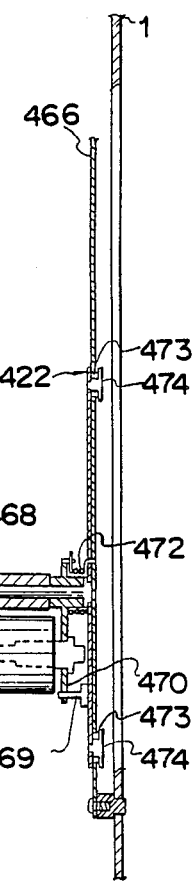
FIG. 12
FIG. 14
FIG. 13

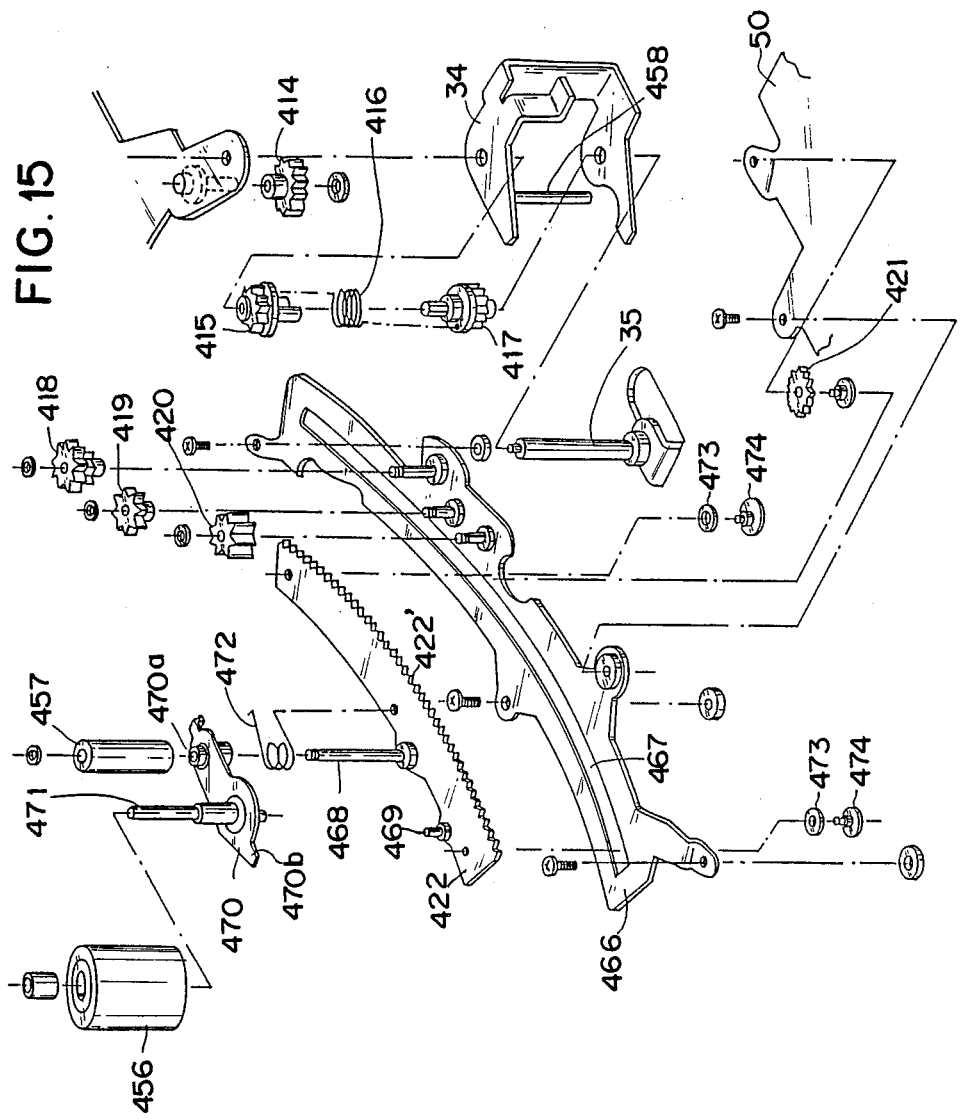

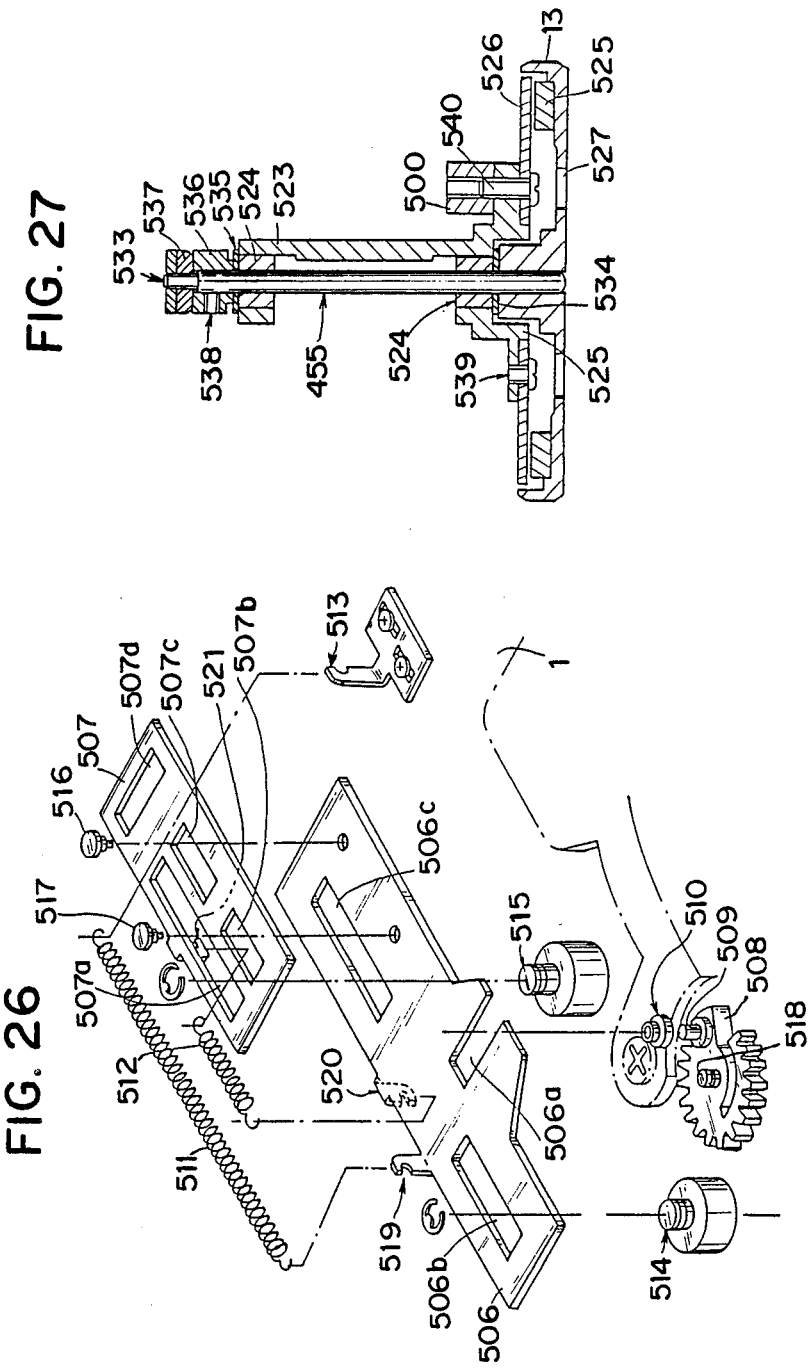

TAPE LOADING APPARATUS HAVING AN ARRANGEMENT FOR CONTROLLING MOVEMENT OF A GUIDE ROLLER HOLDER ARM

FIELD OF THE INVENTION

This invention relates to a tape player having a rotating drum head and in particular to a tape path system, which is light, thin and small and has a high reliability, suitably applicable to a 8 mm VTR for use on a vehicle.

BACKGROUND OF THE INVENTION

The 8 mm VTR for use on a vehicle has been developed and several techniques therefor have been already proposed.

However, among the components constituting a 8 mm VTR, e.g. in the tape path system, which is object of this invention, it is desired to make it lighter, thinner and smaller and to ameliorate further its reliability.

OBJECT OF THE INVENTION

In order to meet the demand described above, the primary object of this invention is to provide a tape player, which is light, thin and small and has a high reliability, suitably applicable to a 8 mm VTR etc.

Another object of this invention is to provide a tape player permitting to make assembling work easier and to ameliorate the reliability.

SUMMARY OF THE INVENTION

According to this invention, in a tape player, in which, on the tape loading, a loading block and a subblock are moved along a tape path defined by a guide groove formed by a guide rail through a loading gear and a tape is drawn from a cassette by the loading block and the subblock so that the tape is located around a rotating drum head, a holder arm, on which at least a guide roller for the tape is mounted outside of the tape path, is disposed movably between its retreated position, where it doesn't interfere with the loading block and the subblock and its advanced position, where it fronts on the tape path, and is energized towards its retreated position; control means controlling the movement of the holder arm towards its advanced position is provided; an operating member to operate the control means, after this subblock has passed through a position which is occupied by the guide roller in the advanced position of the holder arm, is disposed on the subblock; a holder arm stopper defining the advanced position of the holder arm is provided; a pushing member is provided, which member pushes the holder arm against this holder arm stopper; a subblock stopper is provided, which stopper regulates the subblock at a position, where the tape is fitted to the rotating drum head by means of the subblock and the guide roller mounted on the holder arm; and a pushing member is provided, which member pushes the subblock against this subblock stopper.

According to this invention, before the tape loading, the loading block and the subblock are located in the cassette mouth; the holder arm having at least a guide roller for the tape rests at its retreated position so that it doesn't interfere with the loading block and the subblock; and a pinch roller is located in the cassette mouth.

From this state, when a cam gear is rotated in the normal direction by a rotational driving source and the loading gear is operated so as to be rotated, the loading block and the subblock move along the tape path from the interior of the cassette mouth. During this movement the tape is loaded by the loading block and the subblock and at the same time is located gradually around the rotating drum head.

When the subblock, which follows the loading block described above, passes through the position where the holder arm is located, the control means controlling the holder arm is operated by an operating member disposed on the subblock and the holder arm is displaced to its advanced position, in which the guide roller for the tape mounted on the holder arm is located at a position where it fronts on the tape path.

When the loading block, the subblock and the holder arm are displaced to their predetermined positions, the subblock is pushed against the subblock stopper by a pushing member and the holder arm is pushed against the holder arm stopper by another pushing member. Since the subblock stopper and the holder arm stopper are located at such positions that they can fit the tape around the rotating drum head by the aid of the subblock and the guide roller mounted on the holder arm, the loaded tape described above is wound around the rotating drum head so as to be fitted to the peripheral surface thereof, which rotating drum head is mounted to be inclined.

When the tape is unloaded, the cam gear is rotated in the reverse direction by the rotational driving source and the pinch roller is operated to be moved to its retreated position away from the capstan. Then, the loading block and the subblock are operated by the loading gear to be moved towards the cassette mouth. During this unloading the control means for the holder arm is operated by the operating member mounted on the subblock moving before the loading block. Thus, the holder arm is operated by this control means to be moved to its retreated position, where it doesn't interfere with the subblock and the loading block.

Subsequently the subblock and the loading block are returned to their determined positions in the cassette mouth; the tape is unloaded; and the pinch roller also is returned to its determined position in the cassette mouth.

BRIEF DESCRIPTION OF THE DRAWINGS

FIG. 4 is a rear view of the driving system for the loading block and the subblock;

FIG. 5 is a front longitudinal cross-sectional view of the same driving system;

FIG. 6 is a side longitudinal cross-sectional view of a part of the driving system indicated in FIG. 5;

FIG. 8 is an enlarged front longitudinal cross-sectional view of the loading block;

FIG. 9 is a plan view of members under the hold plate of the same loading block;

FIG. 10 is an enlarged front longitudinal cross-sectional view of the subblock and members linked therewith;

FIG. 11 is a plan view of the same subblock;

FIG. 12 is a plan view of the same members linked with the subblock;

FIG. 13 is a plan view of the driving system for the pinch roller, the pinch roller loading plate, the pinch roller guide plate, and the pinch roller loading plate;

FIG. 14 is a side longitudinal cross-sectional view in the direction of the length of the pinch roller guide plate;

FIG. 15 is an exploded perspective view of the pinch roller, the pinch roller loading plate and the driving system therefor;

FIG. 26 is an exploded perspective view of the control means for the holder arm;

FIG. 27 is a front longitudinal cross-sectional view of the capstan assembly;

DETAILED DESCRIPTION

A. Principal constituting parts

Figure 1:
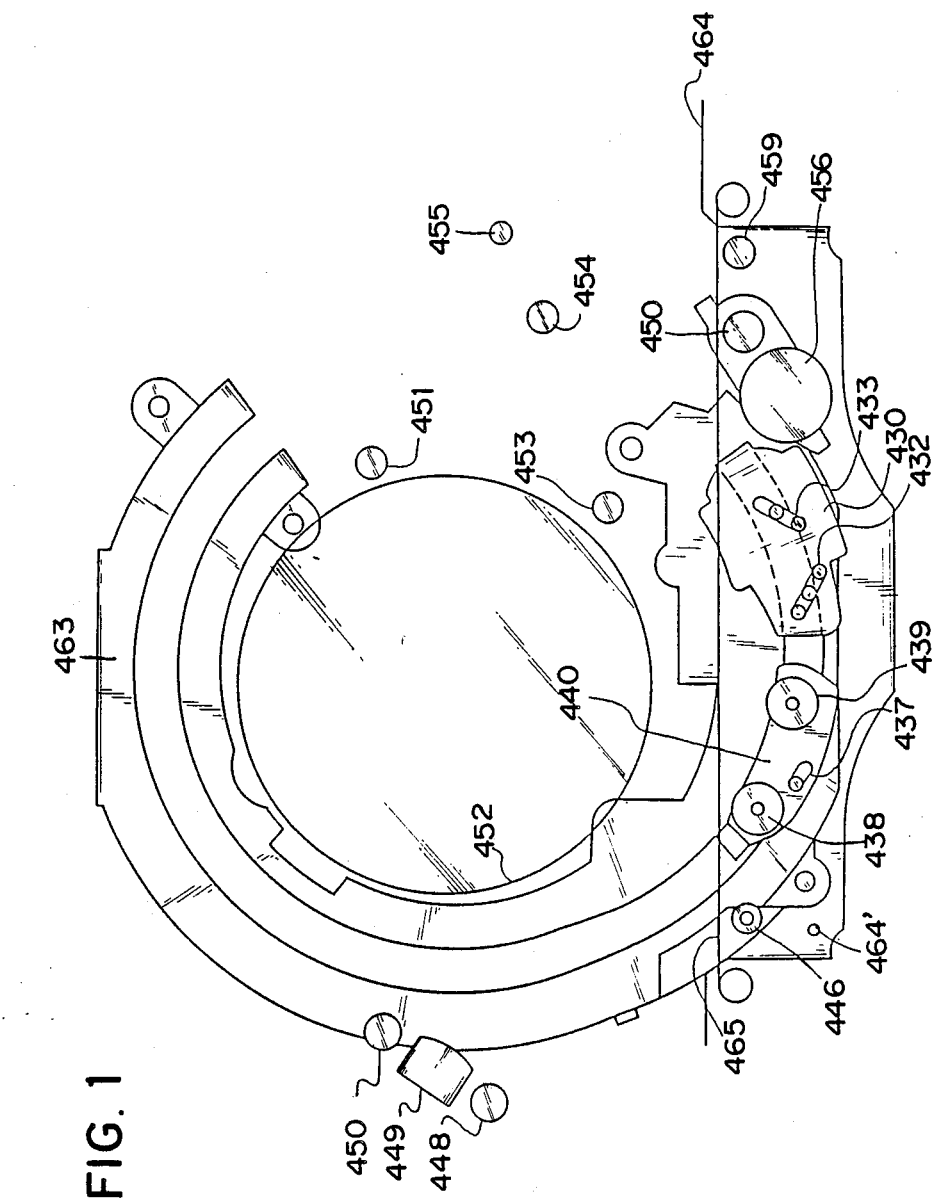
FIG. 1 is a plan view of a tape path system, which is an embodiment of this invention, in the state where the tape is unloaded.

The tape path system in this embodiment is provided with a drum base 500, a guide rail 463 having a guide groove 424, a rotating drum head assembly 452, a capstan motor 401 serving as a reversible rotational driving source, a loading gear 411, a driving system therefor, a loading block 440, a subblock 430, a holder arm 499, guide rollers 448, 450 for the tape and a whole width erasing head 449 mounted thereon, control means for the holder arm, a rack plate 425 serving as an operating member for this control means, a capstan assembly, a pinch roller 456, a driving system therefor, FF/REW rollers 446, 459 and a driving system therefor.

B. Drum base

Figure 30:
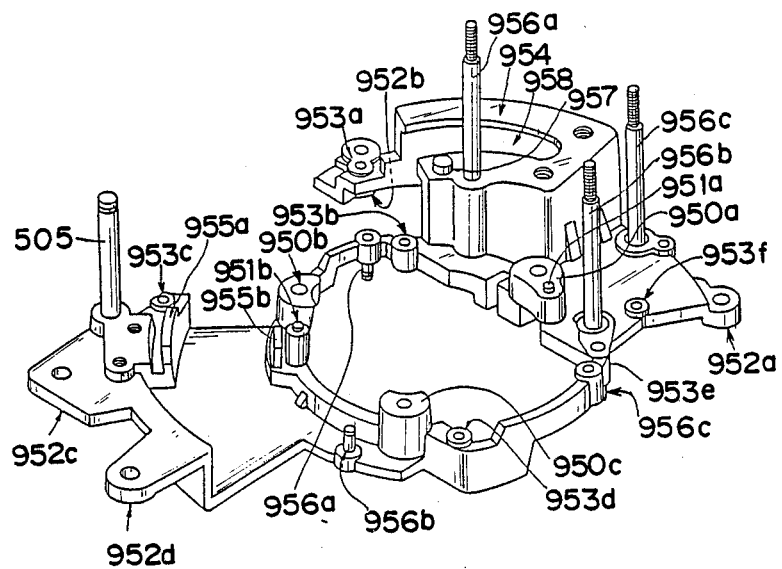
FIG. 30 is a perspective view of the drum base looking down.
Figure 31:
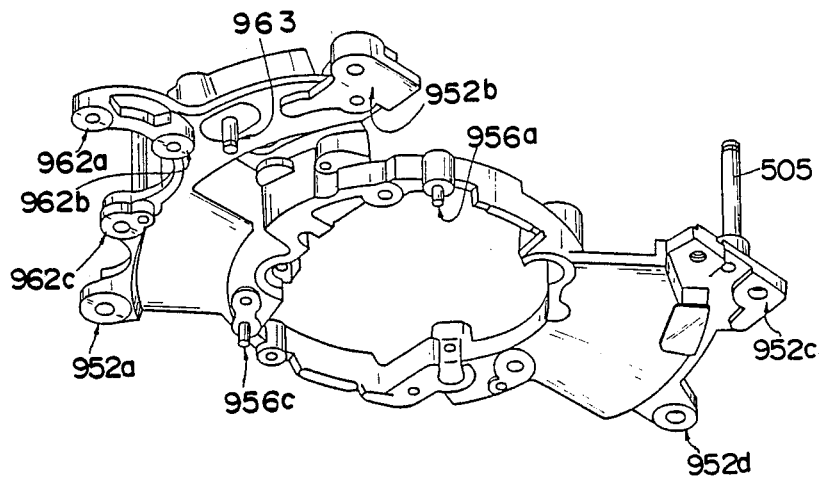
FIG. 31 is a perspective view of the same drum base looking up.

On this drum base 500, in this embodiment, as indicated in FIGS. 30 and 31, are mounted three rotating drum head mounting surfaces 950a to 950c, two rotating drum head positioning pins 951a, 951b, four mechanical chassis mounting surfaces 952a to 952d, six guide rail mounting surfaces 953a to 953f, one loading block positioning surface 954, a pair of subblock positioning surface 955a, 955b, three guide post shafts 956a to 956c, one loading block positioning pin 957, one loading block positioning guide groove 958, three capstan housing mounting surfaces 962a to 962c, one loading gear driving gear shaft 963, and three loading gear guide roller shaft 965a to 965c.

Thus, the drum base 500 is secured to the mechanical chassis 1 through the mechanical chassis mounting surfaces 952a to 952d in a predetermined posture.

C. Guide rail

On this guide rail 463, as indicated in FIGS. 1, 4, 7 and 34, is formed a guide groove, which is used in common for the loading block 440 and the subblock 430.

Figure 34:
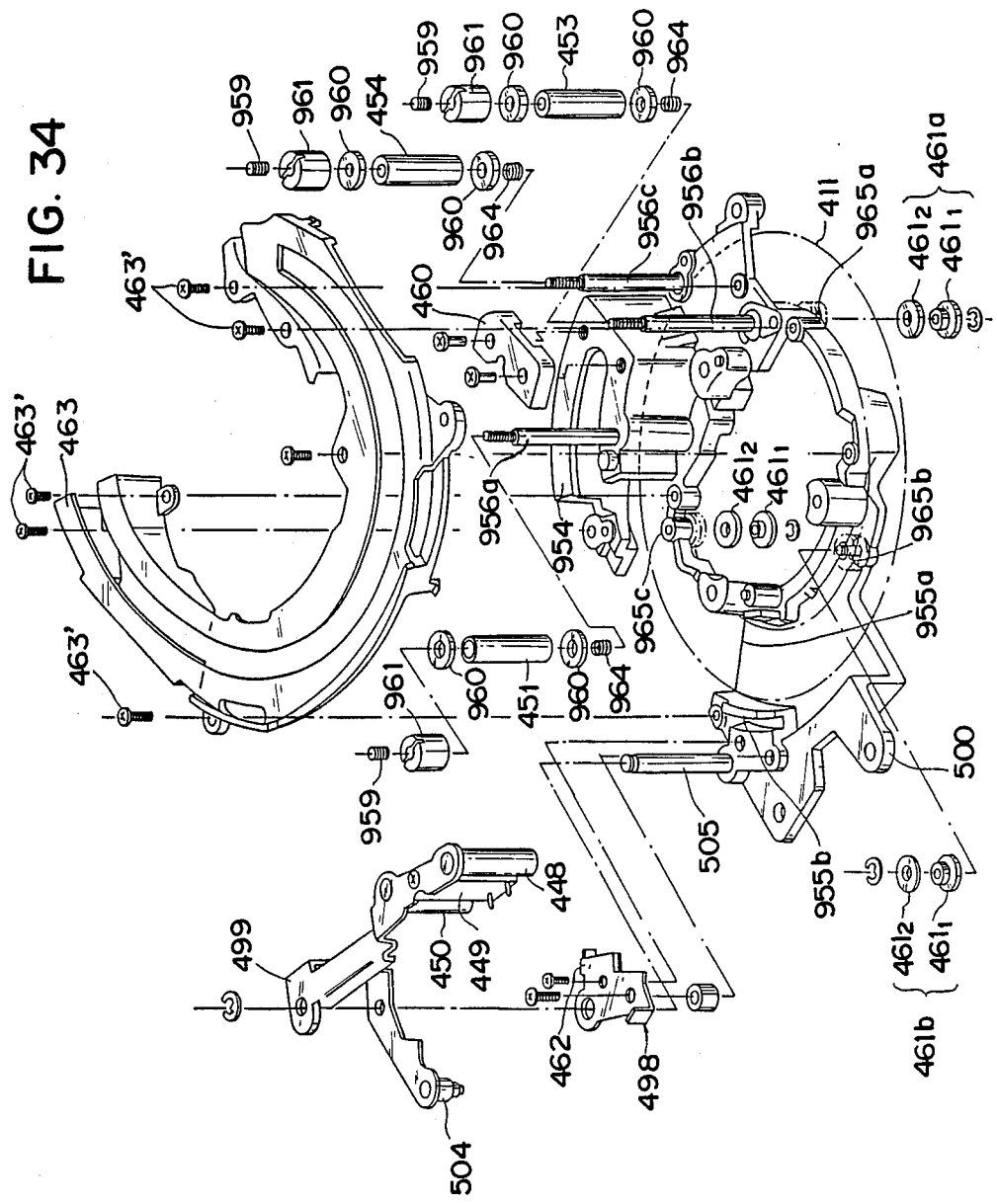
FIG. 34 is a perspective view illustrating the assembling process of the drum base and various members mounted thereon.

The guide rail 463 stated above is disposed on the guide rail mounting surfaces 955a to 955f formed on the drum base 500 described above. As seen in FIG. 34, it is fixed to the drum base 500 by means of a plurality of guide rail mounting screws 463' so as to constitute the tape path from the straight tape portion on the tape supplying reel side to the straight tape portion on the tape rewinding reel side in the cassette 464.

D. Rotating drum head assembly

Figure 35:
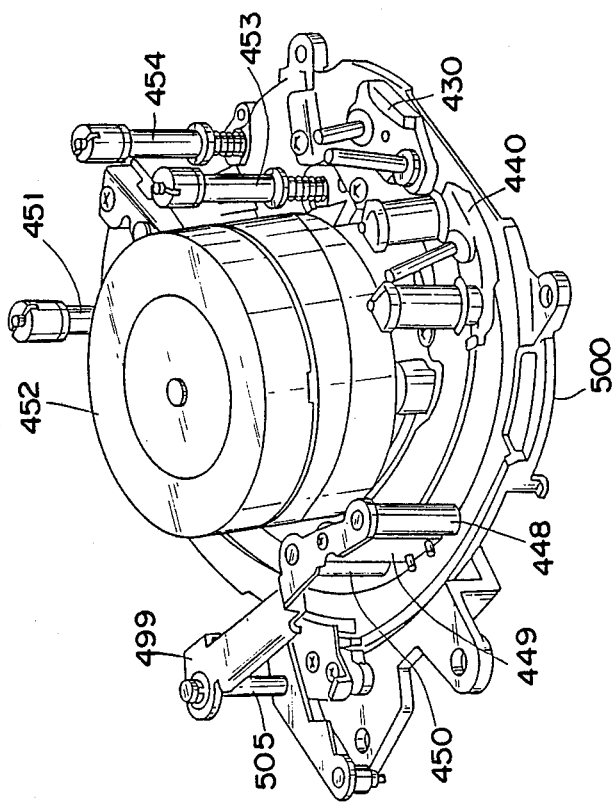
FIG. 35 is a perspective view of the same members assembled together.

This rotating drum head assembly 452 is mounted on the drum base 500 stated above, inclined by a predetermined angle by using the rotating drum head mounting surfaces 950a to 950c. When it is mounted on the rotating drum head mounting surfaces 950a to 950c, the rotating drum head positioning pins 951a, 951b secured to the drum base 500 stated above are inserted in positioning holes (not shown in the figure) formed in the lower drum etc. of the rotating drum head assembly 452 and thus the rotating drum head is mounted on the drum base 500, positioned as indicated in FIG. 35.

The tape 465 is located around the rotating drum head of the rotating drum assembly 452 with a predetermined inclination so as to move along the periphery thereof.

E. Loading gear and driving system therefor

On the loading gear 411 described previously are formed external teeth and a guide groove 424 for the subblock.

Figure 3:
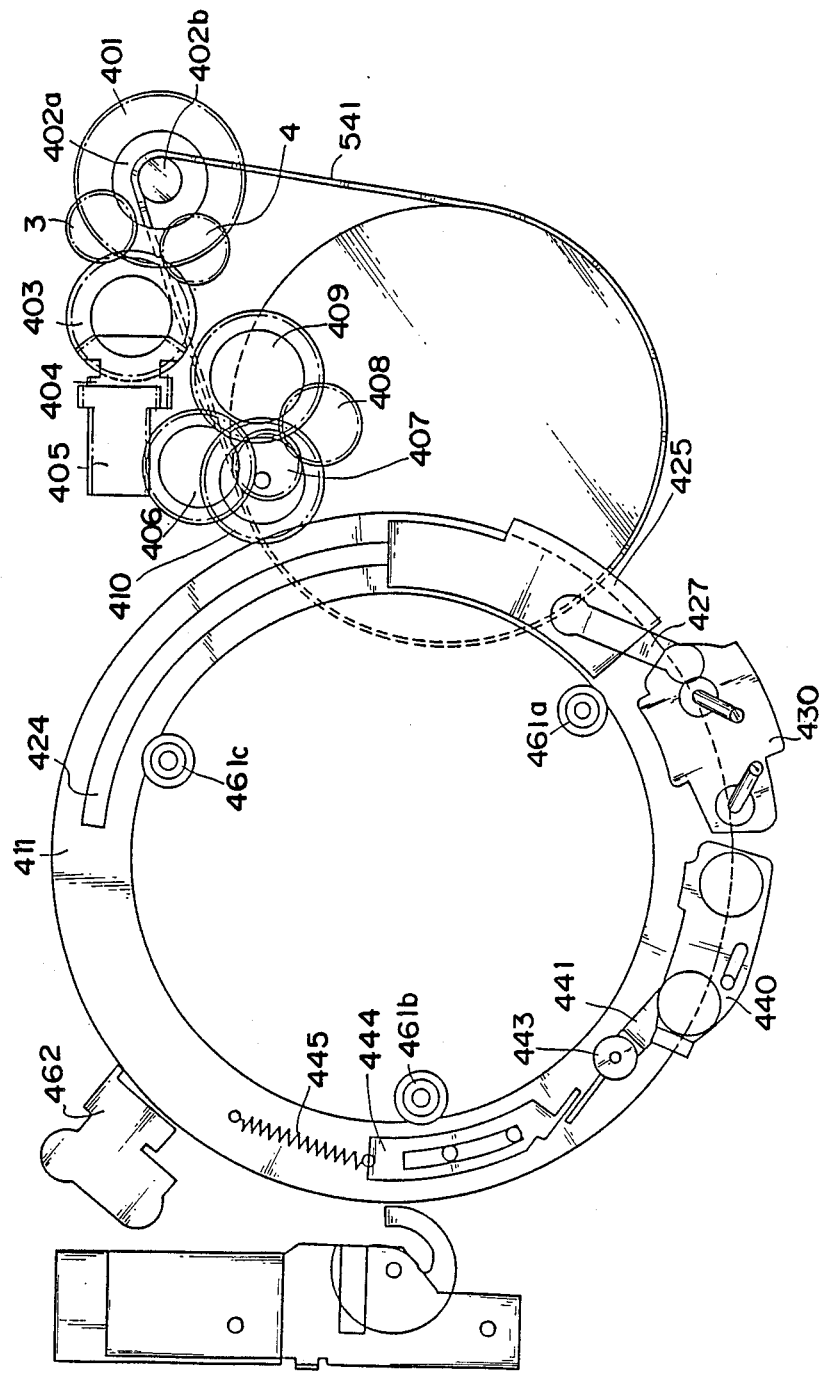
FIG. 3 is a plan view illustrating the loading block, the subblock, a driving system for moving them, the control means for the holder arm, and the part near the subblock stopper.

Further, as seen in FIGS. 3 and 4, the loading gear 411 is guided by the loading gear guide rollers 461a to 461c disposed at spaced locations along the periphery of gear 411. Each of the loading gear guide rollers 461a to 461c is formed in a spur shape by combining two pieces $461_1$ and $461_2$. The pieces $461_1$ and $461_2$ described above are disposed on the upper and lower surfaces of the loading gear 411, respectively, and mounted to the loading gear guide roller shafts 965a to 965c disposed on the drum base 500 described previously.

The driving system for the loading gear 411 is so constructed that a driving force is transmitted from a capstan motor 401 serving as a reversible driving force successively through a gear 402a mounted on the rotating shaft of the capstan motor 401, a pair of gears 3, 4, gears 403a, 403b, 404a, 404b, 405, 406a, 406, 407, 408, 409a, 409b, 410a, and 410b to the external teeth of the loading gear 411 and thus the loading gear 411 is rotated. The pair of gears 3, 4 described above is mounted so that it can be engaged and disengaged with the gear 402a mounted on the rotating shaft of the capstan motor 401 described above through a plate (not shown in the Figure) supported rotatably. Further, this driving system is so constructed that, when the capstan motor 401 is driven to rotate in the normal direction and the gears 3, 4 are engaged with the gear 402a, the loading gear 411 pulls the loading block 440 and the subblock 430 through the gear train in the tape loading direction and when the capstan motor is driven to rotate in the reverse direction and the gears 3, 4 are engaged with the gear 402a, the loading gear 411 pulls the loading block 440 and the subblock 430 through the gear train in the tape unloading direction.

F. Loading block and loading block stopper

Figure 7:
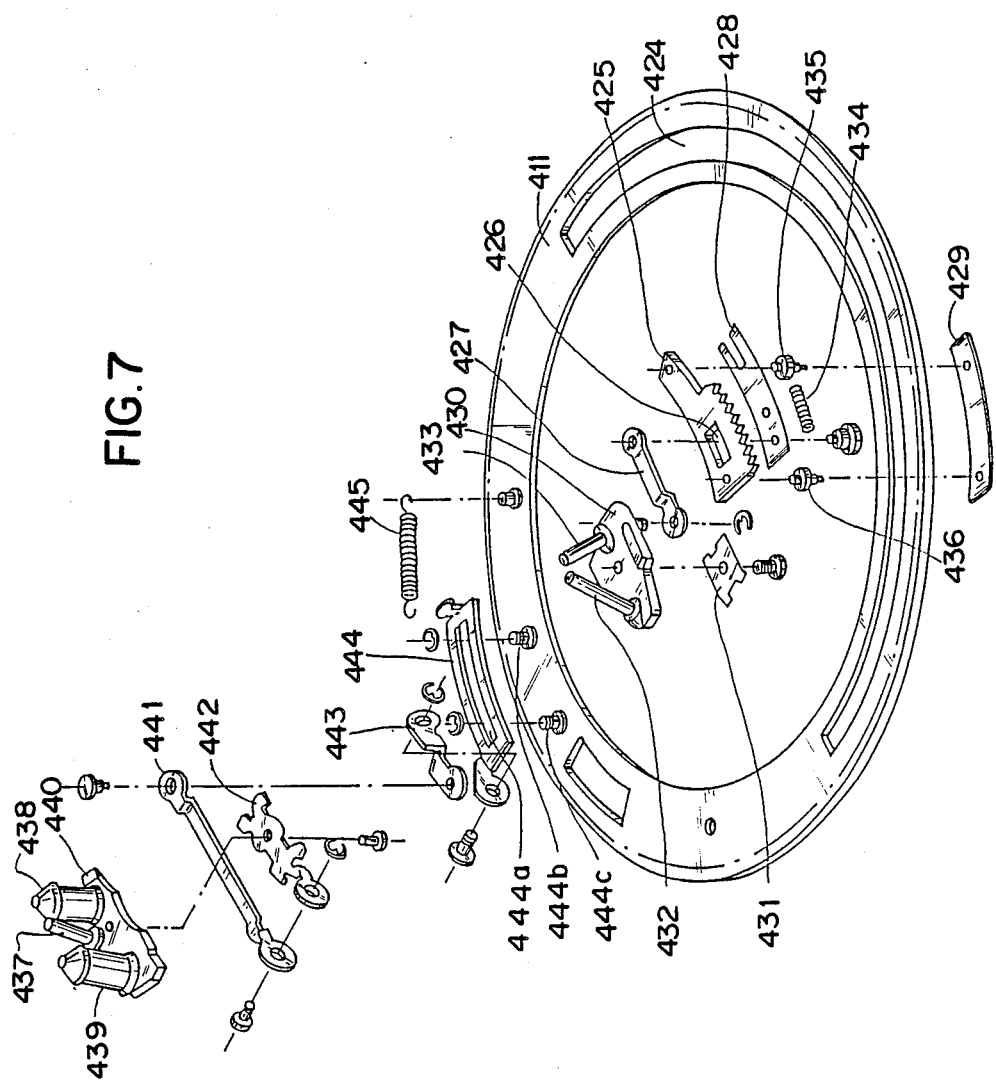
FIG. 7 is an exploded perspective view of the loading gear, the loading block and the subblock.

On the upper surface of this loading block 440 are disposed an inclined post 437 and guide rollers 438 and 439 for the tape, as indicated in FIGS. 1, 4 and 7. The guide rollers 438, 439 stated above are disposed before and behind the inclined post 437 in the tape loading direction.

The loading block 440 stated above is mounted movably along the guide groove formed in the guide rail 463.

On the bottom surface of the loading block 440 is mounted a hold plate 442, as indicated in FIGS. 7 to 9 and the loading block 440 is held by this hold plate 442 not to slip out from the guide rail 463. On the hold plate 442 stated above is coupled a link arm at its rear end in the tape loading direction by means of a pin and this link arm 441 stretches forward in the tape loading direction below the guide rail 463. At the front end of the link arm 441 is coupled the rear end of a connect plate 443 by means of a pin and at the front end of this connect plate 443 is coupled a slide plate 444 by means of a pin. On the slide plate 444 is formed an elongated hole 444a, which extends in the tape loading direction, and this slide plate 444 is linked with the loading gear 411 through two pins 444b and 444c planted on the loading gear 411 with an interval shorter than the elongated hole 444a described previously. A tensile spring 445 in hooked on the front end of the slide plate 444 and on a pin mounted before the pin 444c on the loading gear 411. The tensile spring 445 acts as a thrusting member thrusting the loading block 440 against the loading block stopper 460.

The link arm 441, the hold plate 442, the connect plate 443, the slide plate 444 and the tensile spring 445 described above are disposed in the space between the guide rail 463 and the loading gear 411.

Figure 2:
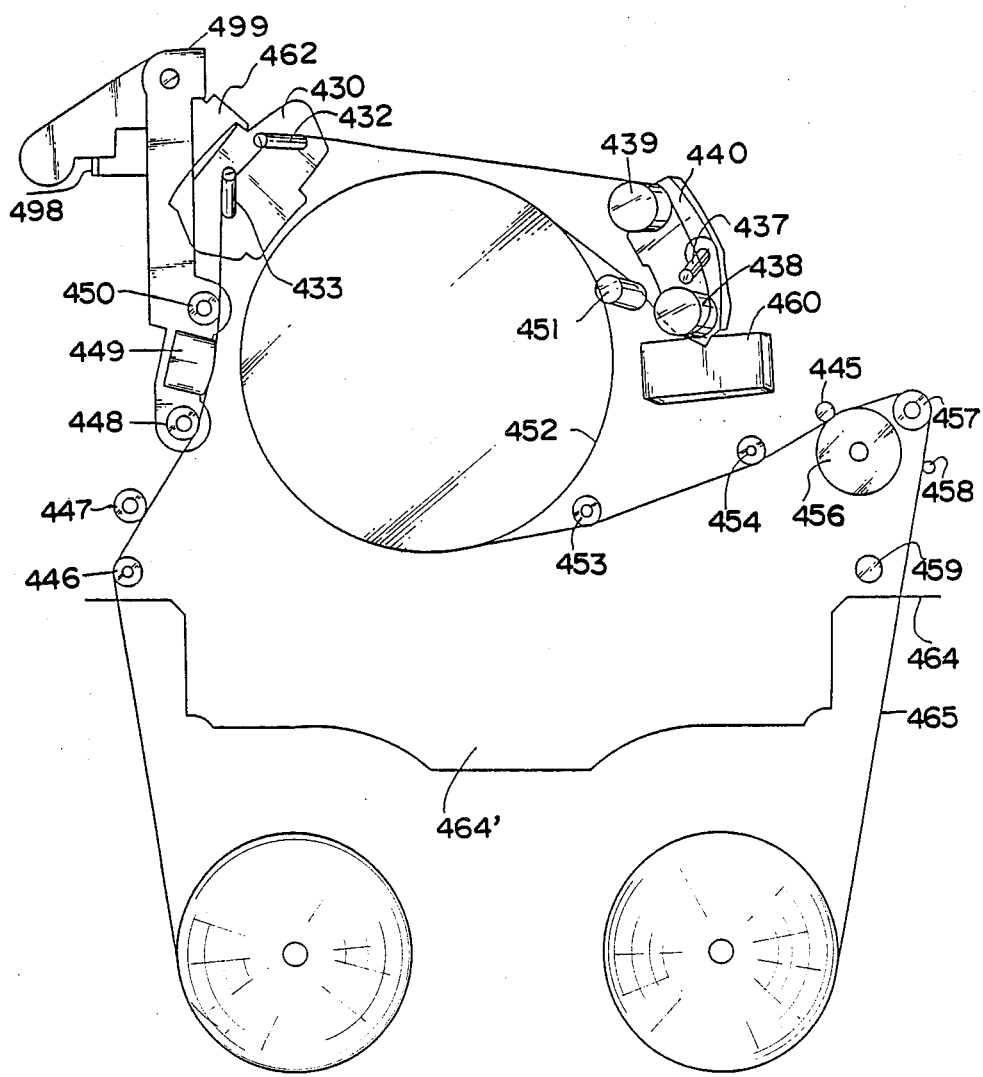
FIG. 2 is a plan view of the same in the state after the tape loading.
Figure 32:
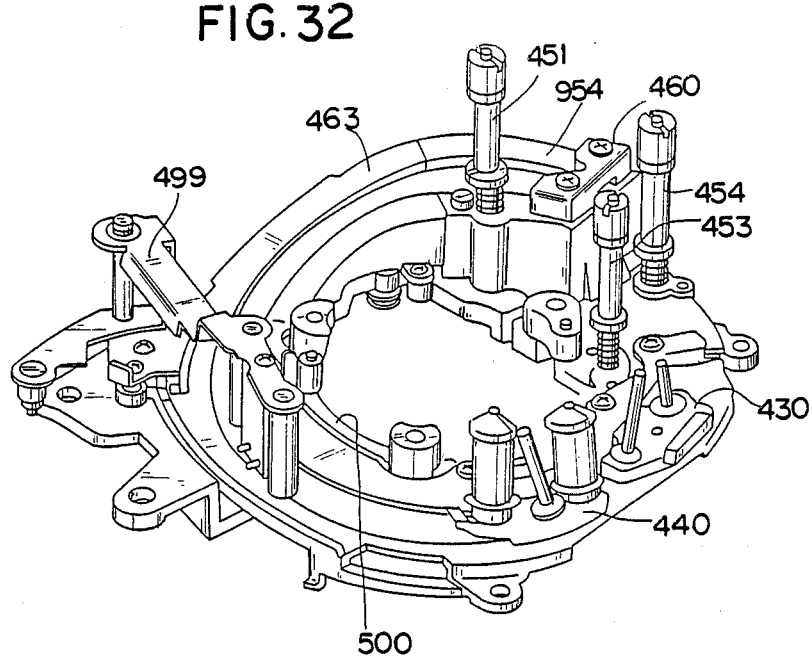
FIG. 32 is a perspective view illustrating an arrangement of the members mounted at their determined positions on the drum base.
Figure 33:
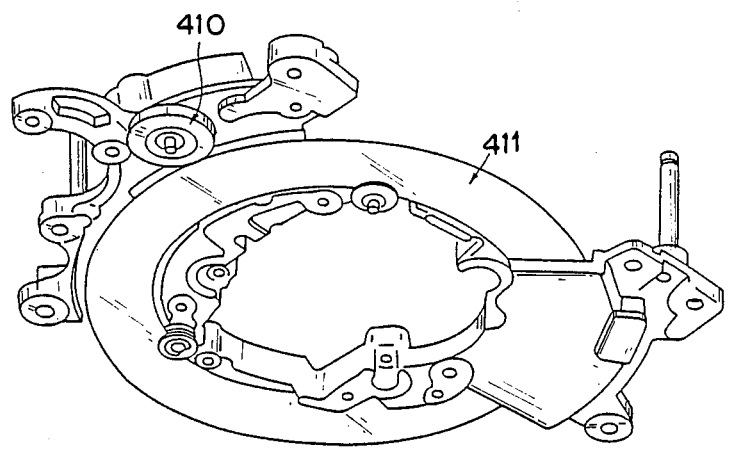
FIG. 33 is a perspective view of the loading gear mounted on the drum base and the gear driving gear looking up.

The loading block stopper 460 stated above is mounted on a loading block positioning surface 954, as indicated in FIGS. 2, 32 and 34.

When the loading gear 411 is operated so as to rotate in the normal direction, the loading block 440 is pulled in the forward drive direction through the engagement of the pin 444b mounted on the loading gear 411 with the end portion of the elongated hole 444a formed in the slide plate 444, the connect plate 443, the link arm 441 and the hold plate 442. Thus, it loads the tape 465 through the inclined post 437 and guides the tape 465 by guide rollers 438 and 439. Further, during the last step of the tape loading the loading block 440 is guided by the guide groove 958 formed in the drum base 500 described previously towards the loading block positioning surface 954, as indicated in FIG. 30. In this way it is positioned by this loading block positioning surface 954 and locates the tape 465 around the rotating drum head at a height and an inclination corresponding thereto, cooperating with other members. Then, after the loading block 440 has been brought into contact with the loading block stopper 460, as the loading gear 411 is operated to rotate excessively by a predetermined rotation angle, the loading block 440 is thrust against the loading block stopper 460 by the resilient force produced by stretching the tensile spring 445.

G. Subblock and subblock stopper

On this subblock 430, as indicated in FIGS. 1 to 3 and FIG. 7, inclined posts 432 and 433 are mounted on its upper surface. Further, on one side of the front end of the subblock 430, as indicated in FIG. 11, is formed a contact portion 430, which is brought into contact with the subblock stopper 462.

The subblock 430 stated above is mounted movably along the guide groove formed in the guide rail 463.

On the bottom surface of the subblock 430 is mounted a hold plate 431, as indicated in FIGS. 7, 10 and 11, and in this way the subblock 430 is held not to slip out from the guide rail 463. With the rear end of the subblock 430 described previously is coupled the front end of the arm 427 by means of a pin. With the rear end of the arm 427 is coupled a rack plate 425 by means of a pin. This rack plate 425 is so constructed that it acts as an operating member for control means for the holder arm 499. The rack plate 425 is coupled with the arm 427 stated above through a groove 426 extending in the tape loading direction and formed in the middle portion in the longitudinal direction and engaged by a pin, so that the rack plate 425 is engaged smoothly with an intermittent gear 508 stated later, which constitutes control means for the holder arm 499. With the lower part of the rack plate 425 is coupled the front end of the subplate 428 by means of a pin and at the rear half of the subplate 428 is formed a groove extending in the tape loading direction. Further, the rack plate 425 is coupled with a hold plate 429 disposed on the lower part of the loading gear 411 through pins 435 and 436. These pins 435 and 436 are inserted in a guide groove 424 formed in the loading gear 411. The subblock 430 and members belonging thereto are so constructed that they are movable without slipping out from the guide groove 424 owing to the hold plate 429 and the pins 435, 436 described previously. On the subplate 428, as indicated in FIGS. 10 and 12, is mounted a spring holding pin 428', and a compression spring 434 is interposed between this spring holding pin 428' and the pin 435 stated above. This compression spring 434 acts as a thrusting member thrusting the subblock 430 against the subblock stopper 462.

The hold plate 431, the arm 427, the rack plate 425 and the subplate 428 described previously are disposed in the space between the guide rail 463 and the loading gear 411 and the compression spring 434 is interposed between the spring holding pin 428' and the pin 435 in the space between the rack plate 425 and the hold plate 429 so that the whole system can be made smaller.

Figures 20, 22, 23:
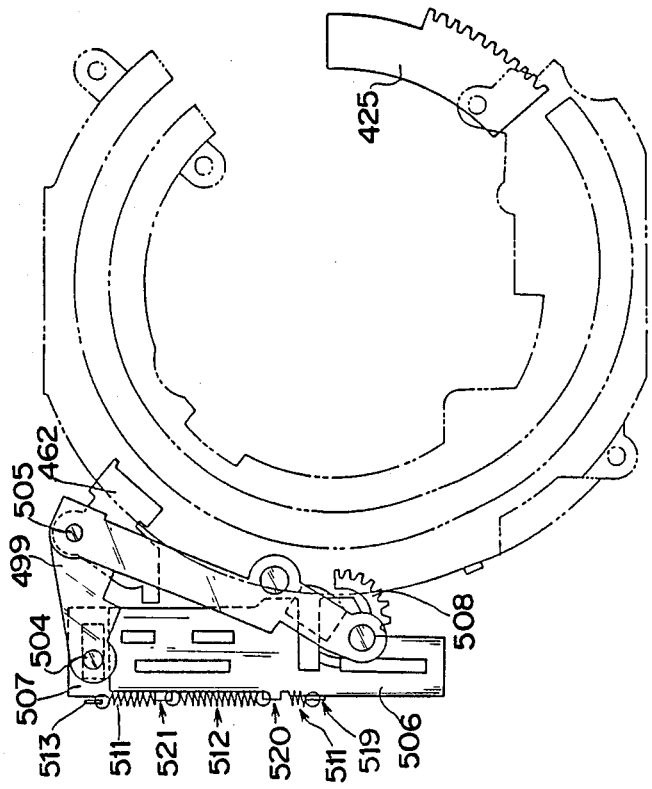
FIG. 20 is a side longitudinal cross-sectional view of the FF/REW roller and its linking part.
FIG. 22 is a plan view of the guide roller for the tape, the holder arm on which a whole width erasing head is mounted, control means therefor and a part near the subblock stopper.
FIG. 23 is a side longitudinal cross-sectional view of the same members.
Figure 24:
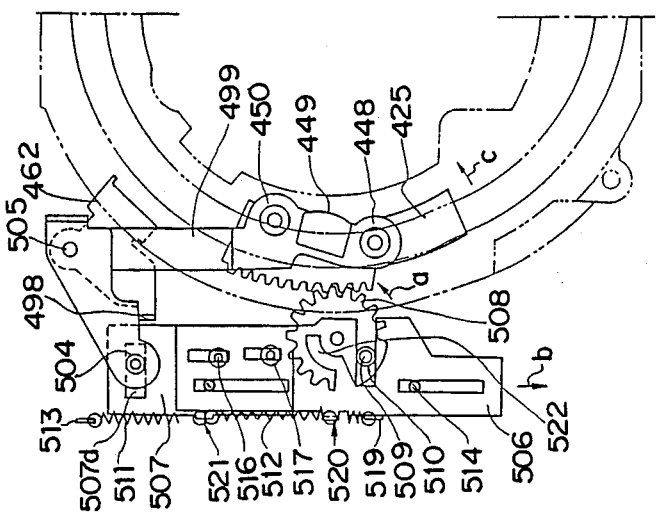
FIG. 24 is a plan view showing a working configuration of the control means for the holder arm and the operating member disposed on the subblock.

The subblock stopper 462 has inserted through it a holder arm shaft 505, as indicated in FIGS. 22, 24 and 34, and is fixed to the drum base 500. Further, a holder arm stopper 498 is formed on the subblock stopper 462.

When the loading gear 411 is operated to rotate in the normal direction, the pin 435 is brought into contact with the rear end of the guide groove 424 on the loading gear 411; this pin 435 is pushed by the loading gear 411; the subblock 430 is pushed in the forward drive direction through the rack plate 425 and the arm 427, and loads the tape 465 with the inclined posts 432 and 433. Then, in the last step of the tape loading by the subblock 430, the rack plate 425 is engaged with the intermittent gear 508, which is the control means for the holder arm 499, and operates the control means. Subsequently the subblock 430 is positioned by the subblock positioning surfaces 955a, 955b formed on the drum base, as indicated in FIGS. 30 and 34, and locates the tape 465 around the rotating drum head at a height and an inclination corresponding thereto, cooperating with other members. Then, after the subblock 430 has been brought into contact with the subblock stopper 462 through its contact portion, a compression spring 434 is compressed by the fact that the loading gear 411 is operated to rotate excessively by a predetermined rotation angle, the subblock 430 is thrust against the subblock stopper 462 by the resilient force of the compression spring 434.

H. Holder arm, guide roller for the tape, whole width erasing head, control means for the holder arm, and holder arm stopper The holder arm 449 stated above is formed in a reversed shape of a Japanese letter " ν " in the top view, as seen from FIGS. 22 and 23. Further, the holder arm 499 is mounted rotatably on the holder arm shaft 505 disposed on the drum base 500 through a mounting hole formed in its front end portion in the tape loading direction, as indicated in FIGS. 30 to 32 and 34.

Figure 25:
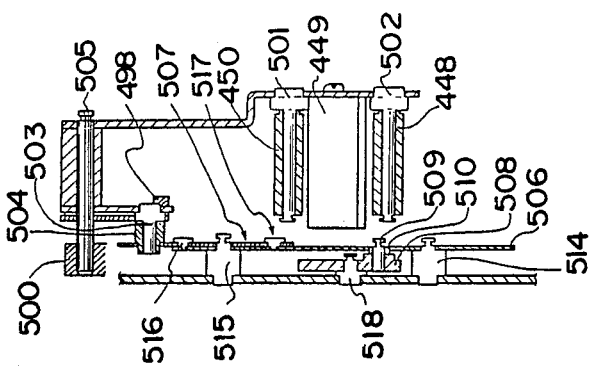
FIG. 25 is a side longitudinal cross-sectional view of the same members.

Approximately at the middle portion of the rear half in the tape loading direction of the holder arm 499 stated above is secured a whole width erasing head (FE head) 449. This whole width erasing head 449, on the front and rear sides in the tape loading direction, is disposed between guide rollers 450 and 448 for the tape. These guide roller 450 and 448 are mounted rotatably on the holder arm 499 through the guide roller shafts 501, 502, as indicated in FIG. 25. At the end portion of the part stretching from the front end portion in the transverse direction is mounted a roller 504 through a pin 503, as indicated in FIGS. 22, 24 and 25. This roller 504 serves as the point of action of the holder arm 499.

The control means for the holder arm 499 consists of holder arm operating plates 506 and 507, an intermittent gear 508 and tensile springs 511, 512, as indicated in FIGS. 22 to 26.

On one 506 of the holder arm operating plates, as seen from FIG. 26, are formed a first, a second and a third groove 506a, 506b and 506c, and spring hooks 519 and 520. On the other 507 of the holder arm operating plates are formed a fourth, a fifth, a sixth and a seventh groove, 507a, 507b, 507c and 507d and a spring hook 521. The first groove 506a stated above is so formed that it is long and stretches from one side to the other in the direction of the width of the holder arm operating plate 506. The second and the third groove 506b 506c are so formed that they extend in the direction of the length of the holder arm operating plate 506, interposing the first groove 506a therebetween. The fourth groove 507a is so formed that it extends in the direction of the length of the holder arm operating plate 507, corresponding to the third groove 506c. The fifth and the sixth groove 507b and 507c are so formed that they are parallel to the fourth groove 507a with an interval in the direction of the width of the holder arm operating plate 507. The seventh groove 507d is so formed at the front end portion of the holder arm operating plate 507 stated above that it extends in the direction of the width of the holder arm operating plate 507. Further, one holder arm operating plate 506 is so constructed that its straight stroke is large and the other holder arm operating plate 507 is so formed that its straight stroke is determined by the rotation angle of the holder arm 499.

The intermittent gear 508 stated above is mounted rotatably on the mechanical chassis 1 through a pin 518, as indicated in FIGS. 23, 25 26. On this intermittent gear 508 is disposed a roller 510 through a pin 509 and this roller 510 is engaged with the first groove 506a formed in the holder arm operating plate 506. On the intermittent gear 508 is formed a cut-off portion 528 by cutting-off a part of the peripheral portion towards the center and an arc shaped part therefrom so that the gear 508 has a certain resiliency. With the intermittent gear 508 is engaged a rack plate 425, which is an operating member mounted on the subblock 430.

With the second groove 506b formed in the holder arm operating plate 506 is engaged a stand pin 514 mounted on the mechanical chassis 1, as indicated in FIGS. 23 to 26. With the third groove 506c formed in the holder arm operating plate 506 and the fourth groove 507a formed in the holder arm operating plate 507 is engaged another stand pin 515 mounted on the mechanical chassis 1, as indicated in FIGS. 23 to 26. With the fifth and the sixth groove 507b and 507c formed in the holder arm operating plate 507 are engaged guide pins inserted in the holder arm operating plate 506 as seen from FIG. 26. With the seventh groove 507d formed in the holder arm operating plate 507 is engaged a roller 504 disposed at the acting end portion of the holder arm 499, as indicated in FIGS. 22 to 25.

One 511 of the tensile springs is hooked on a spring hook 519 formed on the holder arm operating plate 506 and a hook plate 513 fixed on the mechanical chassis 1 so that the holder arm operating plate 506 is energized forward towards the holder arm stopper 498 by this tensile spring 511. The other tensile spring 512 is hooked on a spring hook 520 formed on the holder arm operating plate 506 and a spring hook 521 formed on the other holder arm operating plate 507 so that the difference between the straight stroke of the holder arm operating plate 506 and that of the holder arm operating plate 507 is absorbed by this tensile spring 512 and that the holder arm operating plate 506 is operated so as to follow the holder arm operating plate 507.

The holder arm stopper 498 stated above is formed together with the subblock stopper 462 in one body so that the acting end portion of the holder arm 499 is brought into contact therewith and that it regulates the holder arm 499 at its predetermined advanced position, as indicated in FIGS. 24 and 25.

The holder arm 499 and the control means therefor are so constructed that during the modes other than the play mode the holder arm operating plate 506 is energized forward towards the holder arm stopper 498 by the action of the tensile spring 511, that the holder arm operating plate 507 is pushed in the same direction, that the holder arm 499 is energized rotatably clockwise in FIG. 22 through the seventh groove 507d formed in this holder arm operating plate 507 and the roller 504 disposed at the acting end portion of the holder arm 499 and that the whole width erasing head 449 disposed on the holder arm 499 and the guide rollers 448, 450 for the tape rest at their retreated positions away from the tape path, as indicated in FIG. 24.

When the subblock 430 passes through the position, where the control means for the holder arm 499 is set, during the tape loading process, the rack plate 425 mounted on the subblock 430 is engaged with the intermittent gear 508 of the control means. After the rack plate 425 has been engaged with the intermittent gear 508, when the subblock 430 is displaced further for the tape loading, the intermittent gear 508 is operated to rotate counterclockwise by the rack plate 425, as indicated by an arrow a in FIG. 24; the holder arm operating plate 506 moves in the direction indicated by an arrow b in FIG. 24 by the action of the roller 510 disposed on this intermittent gear 508 and the first groove 506a formed in the holder arm operating plate 506; and the holder arm operating plate 507 linked with the holder arm operating plate 506 by the engagement of the pins 516, 517 with the fifth and the sixth groove 507b, 507c and the tensile spring 512 is displaced in the direction indicated by the arrow b, following the holder arm operating plate 506 described previously. When the holder arm operating plate 507 is displaced in the direction indicated by the arrow b, the acting end portion of the holder arm 499 is pulled in the direction indicated by the arrow b by the action of the seventh groove 507d formed on the holder arm operating plate 507 and the roller 504 disposed on the holder arm 499. Thus the holder arm 499 is operated to rotate counterclockwise around the holder arm shaft 505 serving as a fulcrum, as indicated by an arrow c in FIG. 24, and the whole width erasing head 499 and the guide rollers 448 and 450 for the tape are displaced to their advanced positions, where they front on the tape path through the holder arm 499, as indicated in FIG. 24. In this state, the acting end portion of the holder arm 499 is brought into contact with the holder arm stopper 498. After the acting end portion of the holder arm 499 has been brought into contact with the holder arm stopper 498, when the intermittent gear 508 is operated to rotate excessively by a predetermined rotation angle, the tensile spring 511 is elongated and the acting ed portion of the holder arm 499 is thrust against the holder arm stopper 498 by its resiliency.

I. Capstan assembly and driving system therefor

Figure 28:
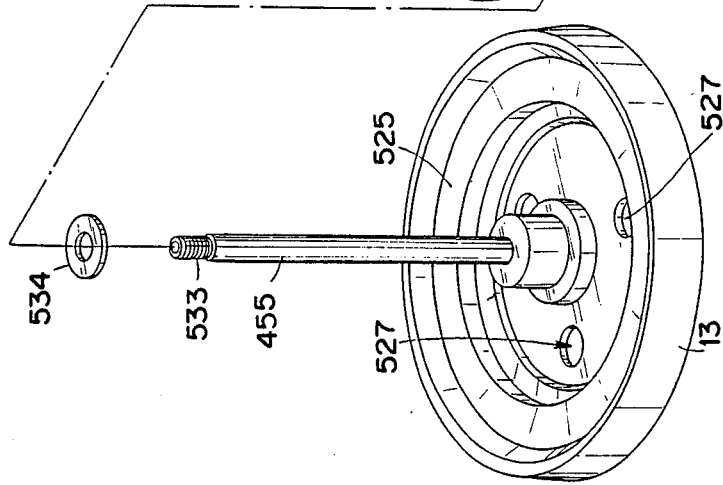
FIG. 28 is an exploded perspective view of the same assembly.

The capstan assembly consists of a capstan pulley 13, a capstan housing 523, a magnet 525, an FG base plate 526, a stopper 536 for preventing slipping out of the capstan and capstan thrust clearance regulating means mounted together in one body, as indicated in FIGS. 27 and 28.

On the capstan housing 523 are formed two bearings 524 mounted at its upper and lower portions, an FG base plate guiding portion 525, an FG base plate mounting surface 529 and three drum base mounting surfaces 530, as indicated in FIGS. 27 and 28. The capstan housing 523 is secured to the drum base 500 by positioning the drum base mounting surface 530 on the capstan housing mounting surfaces 962a to 962c form on the drum base 500 as indicated in FIG. 31, inserting three capstan housing fixing screws 540 through holes for screw champ 527 formed on the capstan pulley 13 and through-holes 531 for the capstan housing fixing screw, as indicated in FIG. 28, and screwing them in threaded holes formed on the capstan housing mounting surfaces 962a to 962c.

The magnet 525 is disposed within the capstan pulley 13, as indicated in FIG. 27; serves as an element detecting the rotation speed of the capstan 455; and transforms the magnetic field produced by the magnet 525 into electric current by means of the FG base plate 526.

On the FG base plate 526 are disposed an FG base plate positioning hole 528 and an FG base plate fixing screw through hole 532, as indicated in FIG. 28. Further, as seen from FIGS. 27 and 28, the FG base plate 526 is secured to the capstan housing 523 by an FG base plate fixing screw 539 screwed in a tapped hole formed in the FG base plate mounting surface 529 of the capstan housing 523 through the FG base plate fixing screw through hole 532 and capstan housing fixing screws 540 screwed in tapped holes formed in the capstan housing mounting surfaces 962a to 962c through capstan housing fixing screw through holes 531 formed in the FG base plate 526, after having inserted a collar formed on the lower part of the capstan housing 523 in the FG base plate positioning hole 528 so as to position the FG base plate positioning hole 528 at the FG base plate mounting surface 529 formed on the capstan housing 523.

As seen from FIG. 27, the capstan 455 is planted on the capstan pulley 13 by pushing it with pressure against a boss on the capstan pulley 13. Further, as indicated in FIG. 27, this capstan 455 is supported by bearings 524 mounted on the upper and the lower portion of the capstan housing 523. Still further, polysliders 534 and 535 serving as lubricant spacers made of synthetic resin are provided at the two extremities of the capstan 455 between the capstan 523 and a stopper 536 and between the bottom portion of the capstan housing 523 and the boss of the capstan pulley 13.

Figure 29:
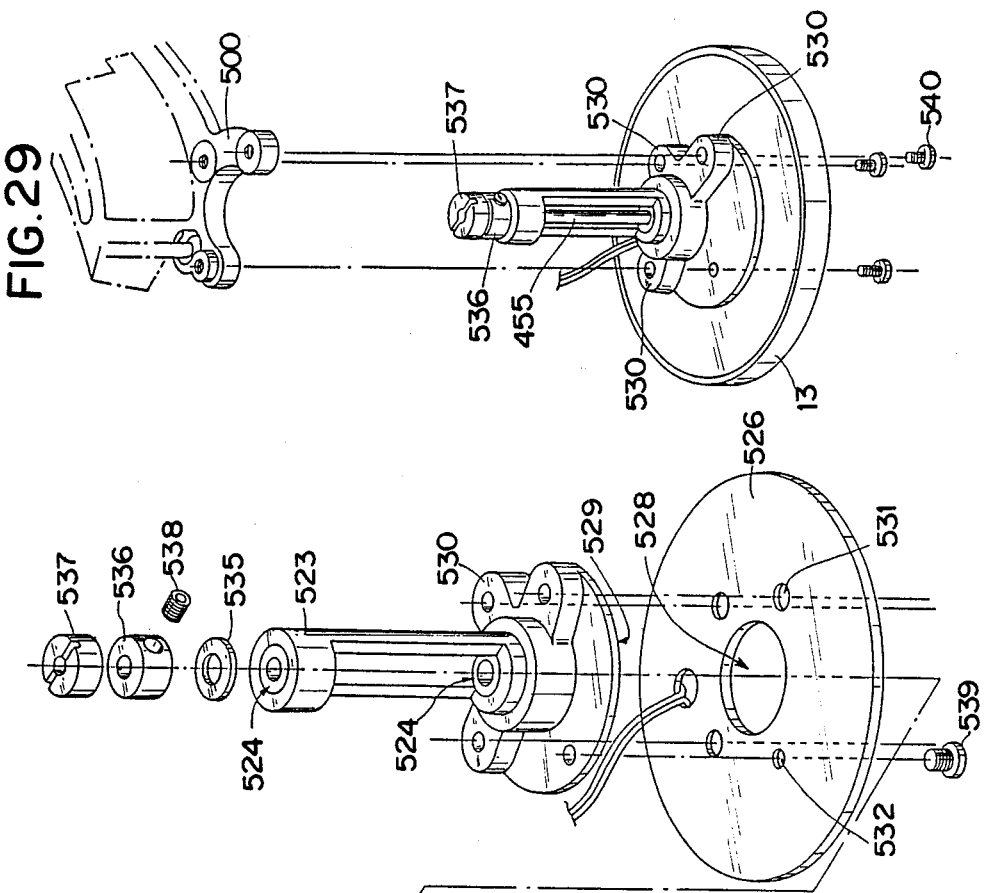
FIG. 29 is a perspective view showing the relation between the capstan assembly and the capstan housing mounting surface on the drum base.

The stopper 536 is secured to a projecting portion of the capstan housing 523 at the upper end portion of the capstan 455 by a set screw 538 so as to prevent slipping out of the capstan 455, as indicated in FIGS. 27 to 29.

The capstan thrust clearance regulating means described previously is so constructed that clearance of the capstan 455 in its thrust direction can be properly regulated by screwing a thrust clearance regulating screw 533 formed on the upper portion of the capstan 455 in a thrust clearance regulating nut 537, as indicated in FIGS. 27 to 29.

The capstan assembly driving system described above consists of a capstan motor 401, a pulley 402b mounted on its rotation axis and a belt 541 linking the pulley 402b and the capstan pulley 13, as indicated in FIG. 3, and is so constructed that it drives the capstan to rotate.

J. Pinch roller and driving system therefor

To the upper surface of the mechanical chassis 1, as seen from FIG. 13, is secured a pinch roller guide plate 466 in the direction from the outside of the mounting position of the capstan housing 523 to the cassette loading position and further outside of these, as indicated in FIG. 15, is planted a pusher plate shaft 35. On the pusher plate shaft 35 is supported rotatably a pusher plate 34 for mounting gears 415 and 417.

In the pinch roller guide plate 466 stated above, as indicated in FIGS. 13 to 15, is formed a guide groove 467 and gear shaft for mounting gears 418, 419 and 420 are disposed thereon. On this pinch roller guide plate 466 is located a pinch roller loading plate 422.

Outside of the pinch roller loading plate 422 is formed a rack 422′ and further on the upper surface on the pinch roller loading plate 422 are disposed a guide roller shaft 468 and an arm stopper 469. Still further, on the lower portion of the pinch roller loading plate 422, as indicated in FIGS. 14 and 15, at least two rollers 473 are mounted with an interval in the direction of the length of the pinch roller loading plate 422 through pins 474 and the pinch roller loading plate 422 is disposed movably along the guide groove 467 formed in the pinch roller guide plate 466 through three rollers 473. On the pinch roller loading plate 422 is mounted a pinch roller arm plate 470.

On the pinch roller arm plate 470, as indicated in FIG. 15, are formed a mounting hole 470a, an engaging nail 470b and a pinch roller shaft 471. Further, this pinch roller arm plate 470 is mounted rotatably around the guide roller shaft 468 serving as a fulcrum by inserting the guide roller shaft 468 disposed on the pinch roller loading plate 422 in the mounting hole 470a.

On the pinch roller shaft 471 is mounted a pinch roller 456 and a guide roller 457 is mounted on a guide roller shaft 468 disposed on the pinch roller loading plate 422 and protruding from the mounting hole 470a formed in the pinch roller arm plate 470. The guide roller 457 is so disposed that it guides the tape 465, preceding the pinch roller 456 during the process, in which the tape 465 is pushed against the capstan 455.

Around the guide roller shaft 468 is mounted a torsion spring. One end portion of this torsion spring 472 is secured to the pinch roller loading plate 422 and the other end portion to the pinch roller arm plate 470. Further the pinch roller arm plate 470 is so disposed that its engaging nail 470b is energized to rotate in the direction, where it is brought into contact with the arm stopper 469.

The driving system for the pinch roller 456 is so constructed that, as indicated in FIGS. 5, 6, 13 and 15, a driving force is transmitted through the cam gear 412, the gears 414, 415, 417, 418, 419 and 421 and the rack 422′ formed in the pinch roller loading plate 422 in this order. On the cam gear 412, as indicated in FIG. 5, are disposed gears 412a, 412b and a ground cam 412c. The gear 412a of the cam gear 412 is linked with the capstan motor 401 through a gear train serving at the same time as the driving system for the loading gear 411, as indicated in FIG. 5. With the gear 412b of the cam gear 412, as indicated in FIG. 5, is engaged a gear 413 of a mode switch 423. With the grooved cam 412c stated above is linked the driving system for the FF/REW roller stated later. The gears 415 and 417 are disposed within the pusher plate 34, as indicated in FIG. 15, and linked with each other by means of a torsion spring 416 so that the gear train is engaged smoothly with the rack 422′ described previously. Further the gear 421 engaged with the rack 422′ is mounted on a third motor gear plate 50 for commuting the modes, as indicated in FIG. 15.

In this way, when the capstan motor 401 is driven to rotate in the normal direction, the pinch roller loading plate 422 is operated to move to its forward drive position along the guide groove 467 formed in the roller guide plate 466 through the gear train constituting the driving system for the pinch roller 456 and thrust against the capstan 455 so that the tape 465 is forwarded.

K. FF/REW roller and driving system therefor

Figure 16:
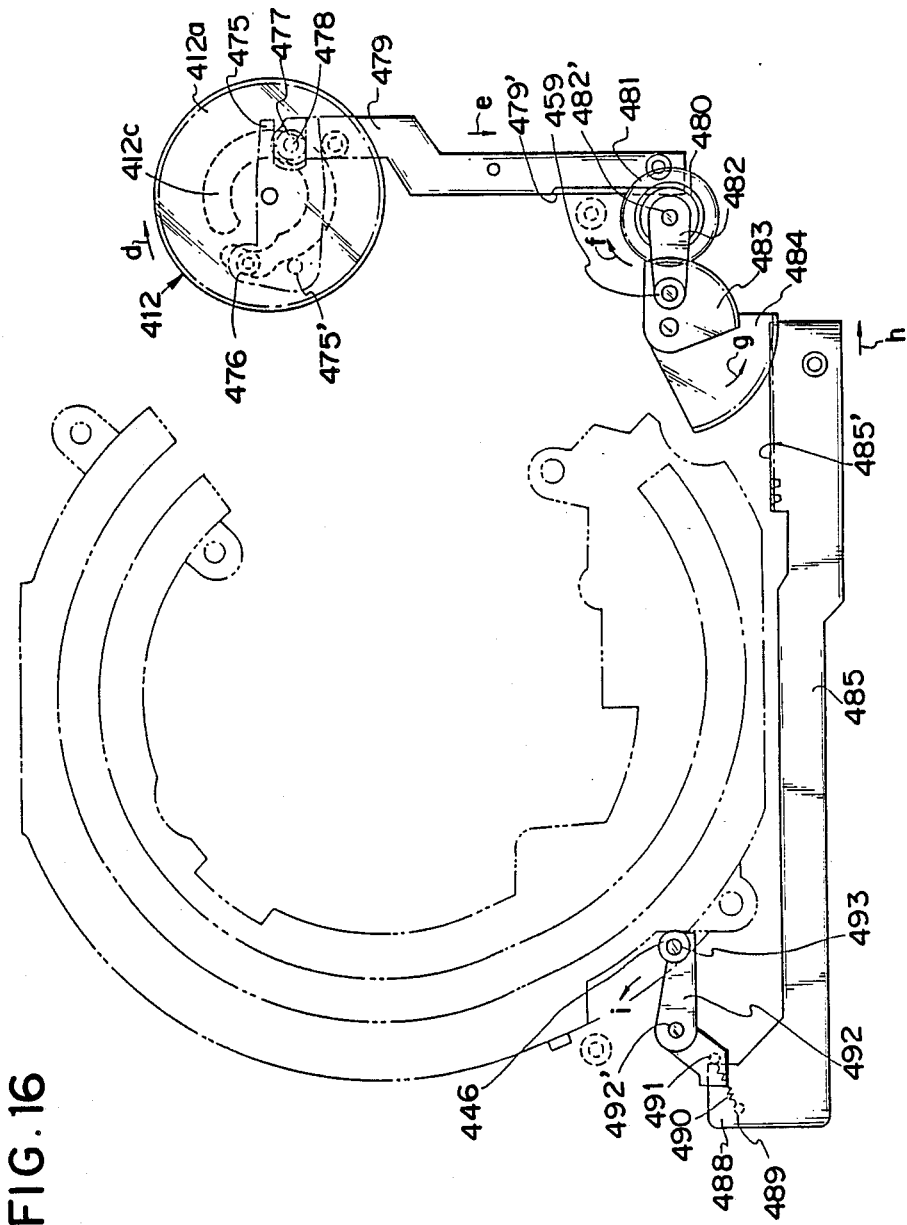
FIG. 16 is a plan view of the FF/REW rollers, the FF/REW roller link plate, and the driving system for the FF/REW rollers in the state before the tape drawing out.
Figure 19:
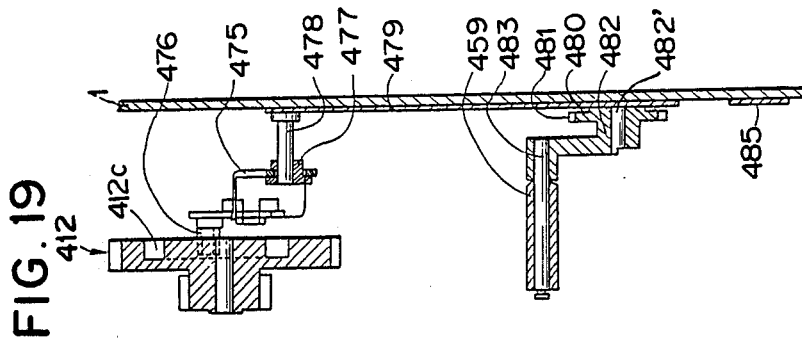
FIG. 19 is a side longitudinal cross-sectional view of a part of the members indicated in FIG. 17.
Figure 21:
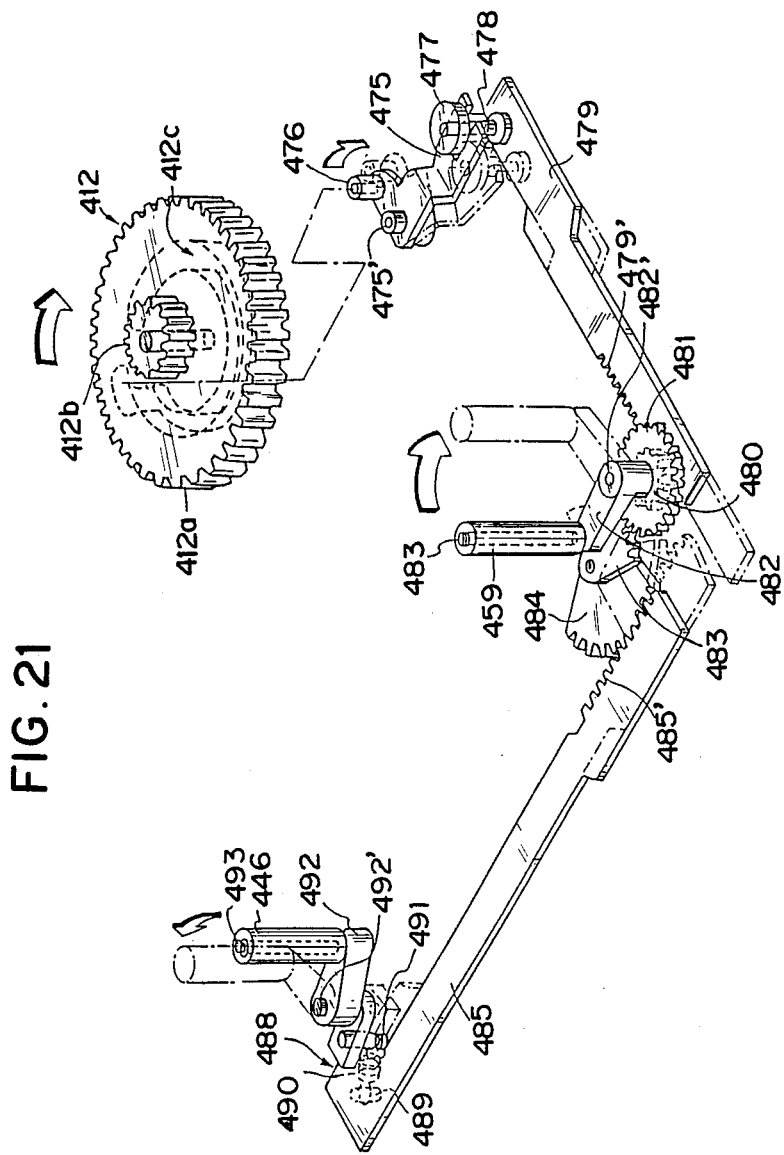
FIG. 21 is a perspective view of the members indicated in FIG. 16.

Between the tape path and the cassette loading position, as indicated in FIGS. 16 and 21, and FF/REW post block 482 is disposed at one side portion and another FF/REW post block 492 at the other side portion.

The one FF/REW post block 482 is mounted on the mechanical chassis 1 rotatably around an FF/REW post block shaft 482′ serving as a fulcrum, as indicated in FIGS. 16 to 21. On this FF/REW post block 482 is formed a two-step gear consisting of gears 480 and 481 in one body. Further, on this FF/REW post block 482 is planted a roller shaft 496 with a certain interval between the FF/REW post block shaft 482′ and it and on this roller shaft 496 is mounted an FF/REW roller 459 rotatably.

The other FF/REW post block 492 is mounted on the mechanical chassis 1 rotatably around an FF/REW post block shaft 492′ serving as a fulcrum, as indicated in FIGS. 16 to 21. On this FF/REW post block 492 is located a roller shaft 493 with a certain interval between the FF/REW post block shaft 492′ and it and on this roller shaft 493 is mounted an FF/REW roller 446 rotatably.

The driving system for the FF/REW rollers 459 and 446 consists of a cam gear 412, an arm plate 475, an FF/REW post operating plate 479, the two-step gear consisting of gears 480 and 481 formed in one body, the gear 483 and the gear 484 formed in one body in the form of a two-step gear and an FF/REW post link plate 485, linked together organically, as indicated in FIGS. 16 to 21.

The cam gear 412 includes a two-step gear consisting of the gear 412a and the gear 412b, and the grooved cam 412c, as indicated in FIG. 5 and described previously. Further this cam gear 412 is linked with the capstan motor 401 through a gear train engaged with the gear 412a, as indicated in FIGS. 5 and 6.

The arm plate 475 stated above is mounted rotatably through an arm plate shaft 475′, as indicated in FIGS. 16 to 19 and 21, and one end portion thereof is engaged with the grooved cam 412c of the cam gear through a cam follower 476. On the other hand on the other end portion is formed an engaging groove for the FF/REW post operating plate.

The FF/REW post operating plate 479 is disposed movably there and back between the arm plate 475 and the position where the FF/REW post block 482 is set, as indicated in FIGS. 16 to 19, and 21, and a rack 479′ is formed on the portion thereof, which is on the FF/REW post block 482 side. This FF/REW post operating plate 479 is engaged with an engaging groove formed in the arm plate 475 through a roller disposed on a pin 478 planted on one end portion thereof.

The two-step gear including the gear 480 and the gear 481 is mounted rotatably together with the FF/REW post block 482 in one body through the FF/REW post block shaft 482′ and the gear 480 is engaged with a rack 479′ formed on the FF/REW post operating plate 479.

The gear 483 in the two-step gear consisting of gears 483 and 484 is engaged with the gear 481 described above.

Figure 17:
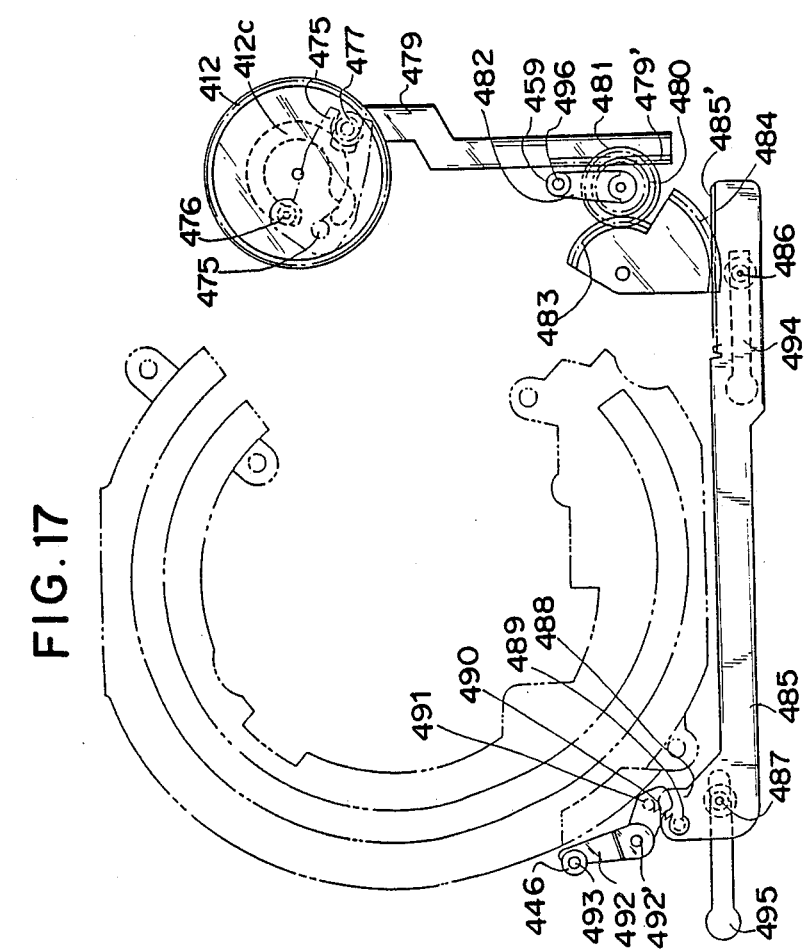
FIG. 17 is a plan view of the same members after the tape drawing out.
Figure 18:
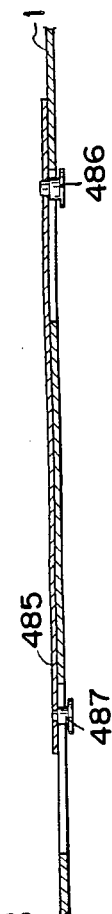
FIG. 18 is a front longitudinal cross-sectional view in the direction of the length of the FF/REW roller link plate.

The FF/REW post link plate 485 is reciprocally movably disposed between the FF/REW post blocks 482 and 492, as indicated in FIGS. 16 to 18 and 21. A rack 485′ is formed on a portion of this FF/REW post link plate 485, which is on the FF/REW post block 482 side and a cam portion 488 is formed on a portion, which is on the FF/REW post block 492 side. The rack 485′ formed on this FF/REW post link plate 485 is engaged with the gear 484 in the two-step gear described previously. The cam portion 488 stated above has a vertical surface and a horizontal surface. This cam portion 488 is engaged with a pin 491 serving as a cam follower mounted on a pivoting arm linked with the FF/REW post block 492 and this pin 491 is thrust against the cam portion 488 by a tensile spring 490 hooked between another pin 489 mounted on the FF/REW post link plate 485 and itself. This FF/REW post link plate 485 is so constructed as to be movable along a straight line through the engagement of the pins 486, 487 for the guide disposed at both the end portions of the FF/REW post link plate 485 with the guiding grooves 494, 495 formed in the mechanical chassis 1, as indicated in FIGS. 17 and 18.

The FF/REW rollers 459 and 446 are so constructed that, in the FF/REW mode, when the cam gear 412 is operated to rotate in the direction indicated by an arrow d indicated in FIGS. 16 and 21, the arm plate 475 is rotated clockwise by the action of the grooved cam 412c through the cam follower 476; the FF/REW post operating plate 479 moves in the direction indicated by an arrow e; the FF/REW post block 482 rotates clockwise through the action of the rack 479' and the gear 480; and the FF/REW roller 459 moves in the direction indicated by an arrow f.

At the same time the gear 484 rotates in the direction indicated by an arrow g through the gears 481, 483; the FF/REW post link plate 485 moves in the direction indicated by h by the action of the gear 484 and the rack 485'; the pin 491 mounted on the pivoting arm of the FF/REW post block 492 is pushed in the direction indicated by the arrow h by the vertical surface of the cam portion formed on this FF/REW post link plate 485; the FF/REW post block 492 is rotated counterclockwise by this pin 491; and owing to this movement the FF/REW roller 446 is displaced in the direction indicated by an arrow i. In addition, the pivot angle of the FF/REW post block 492 is held constant and the position, to which the FF/REW roller 446 is displaced, is also held constant by the fact that the pin 491 described previously passes to the horizontal surface of the cam portion 488.

Further, on the FF/REW mode, the tape path for the FF/REW is formed by the FF/REW rollers 459 and 446.

L. Other principal members

Other principal members including a tension post roller 447 and guide posts 451, 453, 454 and 458 are disposed in this embodiment.

The tension post roller 447 is located between the position where the FF/REW roller 446 is located, and the position where the guide roller 448 mounted on the holder arm 499 is located, as indicated in FIGS. 1 and 2.

The guide post 451 is mounted on a guide post shaft 956a planted on the loading block positioning surface 954, as indicated in FIG. 34, and located in the proximity of the loading block stopper 460, as indicated in FIGS. 1 and 2.

The guide posts 453 and 454 are mounted on the guide posts 956b and 956c, respectively, planted on the drum base 500, as indicated in FIG. 34, and located with intervals between the capstan 455 and the rotating drum head assembly 452, as indicated in FIGS. 1 and 2.

Further, the guide posts 451, 453 and 454 described above are mounted elastically and in such a manner that their positions can be regulated in the axial direction by mounting a spring 964, a guide post flange 960, a guide post itself, another guide post flange 960, and a guide post regulating nut 961 from the bottom to the top in this order on each of the guide posts and by fixing them by means of a rock screw 959.

The guide post 458 stated above is located outside of the acting position of the pinch roller 456, as indicated in FIG. 2.

M. Operation of the tape path in this embodiment

On the tape loading mode the capstan motor 401 is driven in the normal direction.

When the capstan motor 401 is driven in the normal direction, the loading gear 411 is operated to rotate in the normal direction through the gear train linked with the capstan motor 401, as indicated in FIGS. 5 and 6.

When the loading gear 411 is operated to rotate in the normal direction, the loading block 440 and the subblock 430, which are linked therewith, are displaced clockwise along the guide groove formed in the guide rail 463, starting from their determined positions in the cassette mouth 464', as indicated in FIG. 1.

As the loading block 440 moves clockwise in FIG. 1, the tape 465 is loaded by the inclined post 437 mounted thereon and the tape 465 thus loaded is guided by the guide rollers 438 and 439 mounted on the loading block 440.

When the subblock 430 is displaced clockwise in FIG. 1, following the loading block 440 described above, the tape 465 is loaded by the two inclined posts 432 and 433 mounted thereon and the tape 465 is located around the rotating drum head in the rotating drum head assembly 452.

When the subblock 430 approaches the last stop of the tape loading, the rack plate 425 mounted on the subblock 430 is engaged with the intermittent gear 508 of the control means of the holder arm and the intermittent gear 508 is operated to rotate counterclockwise, as indicated by the arrow a in FIG. 24.

When the intermittent gear 508 rotates counterclockwise, the holder arm operating plate 506 moves straight in the direction indicated by the arrow b and the holder arm operating plate 507 is displaced in the same direction, following the holder arm operating plate 506.

When the holder arm operating plate 507 is displaced straight in the direction indicated by the arrow b, the acting end portion of the holder arm 499 is pulled by the action of the seventh groove 507d and the roller 504 engaged therewith and the holder arm 499 rotates counterclockwise around the holder arm shaft 505 serving as a fulcrum, as indicated by the arrow c in FIG. 24.

When the holder arm 499 rotates counterclockwise, the whole width erasing head 449 mounted thereon and the guide rollers 448 and 450 for the tape are operated to move to their advanced positions, where they front on the tape path.

In the state where the whole width erasing head 449 and the guide rollers 448 and 450 have been displaced to their advanced positions, the loading block 440 is brought into contact with the loading block stopper 460 and the subblock 430 is brought into contact with the subblock stopper 462, as indicated in FIG. 2. Further the holder arm 499 is brought into contact with the holder arm stopper 498, as indicated in FIG. 24. From this state the loading gear 411 is further operated to rotate excessively clockwise by a predetermined rotation angle; the loading block 440 is thrust against the loading block stopper 460 by the action of the tensile spring 445 indicated in FIG. 7; the subblock 430 is thrust against the subblock stopper 462 by the compression spring 434 indicated in FIGS. 7, 10 and 11; and the holder arm 499 is thrust against the holder arm stopper 498 by the action of the tensile spring 511 indicated in FIGS. 22 to 24 and 26 so that they are located at their determined positions.

In the state where the loading block 440, the subblock 430 and the holder arm 499 have been located at their determined positions by their stoppers, the loading block 440 is regulated at a determined height and a determined inclination by the loading block positioning surface 954 and the guide groove 958 indicated in FIGS. 30 and 32 and the subblock 430 is regulated at a determined height and a determined inclination by the pair of subblock positioning surfaces 955a and 955b.

Thus, the holder arm 499 is kept in the state where it is thrust against the holder arm stopper through the engagement of the rack plate 425 with the intermittent gear 508, as indicated in FIG. 24.

As the result, the tape can be fitted to and wound around the rotating drum head in the rotating drum head assembly 452, mounted inclined, by means of the inclined post 437 and the guide rollers 438, 439 mounted on the loading block 440, the guide post 451 disposed in the proximity of them, the inclined posts 432, 433 disposed on the subblock 430 and a guide roller 450, which is mounted on the holder arm 499 and plays an important role for constituting the tape path.

Parallelly to the tape loading the cam gear 412 is operated to rotate through the gear train coupled with the capstan motor 412. Further from this cam gear 412 the pinch roller loading plate 422 is driven through the gear train indicated in FIG. 13 and the pinch roller loading plate 422 in displaced to the forward drive side along the guide groove 467 formed in the pinch roller guide plate 466, as indicated by the arrow j. The pinch roller arm plate 470 is displaced, following it; the guide roller 457 and the pinch roller 456 move from the interior of the cassette mouth 464' towards the capstan 455, as indicated in FIG. 1, and guide the tape 565 by means of the guide roller 457. The tape 465 is thrust by the pinch roller 456 against the capstan 455 and forwarded.

On the tape unloading mode, the operations described above for the tape loading mode are reversed.

That is, the capstan motor 401 is rotated in the reverse direction; the pinch roller 456 and the guide roller 457 are operated to move to the rewinding drive side; and the subblock 430 and the loading block 440 are operated counterclockwise in FIG. 2 in this order.

When the subblock 430 is operated to move counterclockwise, the intermittent gear 508 of the control means for the holder arm 499 is operated to rotate clockwise in FIG. 24 by the rack plate 425 and the holder arm operating plate 506 is operated to move in the direction opposite to that indicated by the arrow b. Thus, the holder arm operating plate 507 engaged with the holder arm operating plate 506 is displaced, following it. In this way the holder arm 499 is rotated clockwise around the holder arm shaft 505 serving as a fulcrum, and the holder arm 499 and the whole width erasing head 449 and the guide rollers 448, 450 mounted thereon are operated to move to their retreated positions away from the tape path, and are then kept at their retreated positions by the action of the tensile spring 511.

Then, the pinch roller 456 and the guide roller 457 are returned to their initial positions in the cassette mouth 464', as indicated in FIG. 1. Subsequently the subblock 430 and the loading block 440 are returned to their initial positions in the cassette mouth 464' and the tape 465 is rewound by the rewinding reel.

Now, on the FF/REW mode, the capstan motor 401 is driven in the normal direction and the cam gear 412 is operated to rotate clockwise, as indicated by the arrow d in FIG. 16.

When the cam gear 412 rotates in the direction indicated by the arrow d, the arm plate 475 is operated to rotate clockwise around the arm plate shaft 475' serving as a fulcrum by the action of the grooved cam 412c and the cam follower engaged therewith and the FF/REW post operating plate 479 is moved straight in the direction indicated by the arrow e by the arm plate 475.

When the FF/REW post operating plate 479 is displaced in the direction indicated by the arrow e, the gears 480 and 481 are operated to rotate clockwise by the rack 479' and the FF/REW post block 482 rotates clockwise. Then the FF/REW roller 459 is displaced in the direction indicated by the arrow f and the tape 465 is drawn out.

Parallelly thereto, the gears 483 and 484 are operated to rotate in the direction indicated by the arrow g by the gear 481 and the FF/REW post link plate 485 is displaced straight in the direction indicated by the arrow h by the action of the gear 484 and the rack 485'.

When the FF/REW post link plate 485 is displaced in the direction indicated by the arrow h, the pin 491 serving as a cam follower is thrust by the cam portion 488 mounted on its other end portion and the FF/REW post block 492 is operated to rotate counterclockwise. Thus the FF/REW roller 446 moves in the direction indicated by the arrow i and the tape 465 is drawn out.

As the result, the tape path of the FF/REW mode is formed by the FF/REW rollers 459 and 446.

After the completion of the FF/REW operation, the capstan motor 401 is driven in the reverse direction and the members linked therewith are operated successively in the direction opposite to that described above. Thus the FF/REW rollers 459 and 446 are returned to their initial positions.

Furthermore, according to this invention, the construction of the holder arm 499, the control means therefor, operating members for this control means, the driving system for the loading block 440 and the subblock 430, the driving system for the pinch roller 456, the FF/REW rollers 446, 459, etc. is not at all restricted to that indicated in the figures, but it may be any construction having a desired function in a word.

As explained above, according to the first feature of this invention, since a holder arm, on which at least a guide roller for the tape is mounted outside of the tape path, is disposed movably between its retreated position, where it doesn't interfere with the loading block and the subblock, and its advanced position, where it fronts on the tape path, and is energized towards its retreated position; control means controlling the movement of the holder arm towards its advanced position is provided; and an operating member to operate the control means, after this subblock has passed through a position which is occupied by the guide roller in the advanced position of the holder arm, is disposed on the subblock, an effect to operate the control means for the holder arm and the operating member therefor with a high precision, while making them lighter, thinner and smaller, can be obtained.

According to the second feature of this invention, since a holder arm stopper defining the advanced position of the holder arm is mounted and a pushing member is disposed, which member pushes the holder arm against this holder arm stopper, and in this way the guide roller playing an important role for constituting the tape path can be regulated at its advanced position with a high precision through the holder arm, an effect to ameliorate the reliability can be obtained.

According to the third feature of this invention, since a subblock stopper is mounted, which stopper regulates the subblock at a position where the tape is fitted to the rotating drum head by means of the subblock and the guide roller mounted on the holder arm and a pushing member is provided, which member pushes the subblock against this subblock stopper, it is possible to regulate the subblock, which plays one of the most important roles for constituting the tape path, at the position where it is to be set after the tape loading and therefore an effect to ameliorate the reliability can be obtained.

According to the fourth feature of this invention, since a pinch roller loading plate is disposed movably along a guide groove formed in a pinch roller guide plate outside of the tape path, the pinch roller loading plate supporting a pinch roller; a rack is formed on one side portion of the pinch roller loading plate; and the pinch roller loading plate is directly linked with a gear train for driving the pinch roller loading plate, a plate can be used in common both for mounting the pinch roller and for driving it and therefore an effect to make the tape player further lighter, thinner and smaller can be obtained.

According to the fifth feature of this invention, since a capstan assembly is disposed in the proximity of the tape path, the capstan assembly consisting of at least a capstan pulley, a capstan planted thereon, means for detecting the rotation speed of the capstan, a capstan housing, a stopper for preventing slipping out of the capstan, and means for regulating the capstan thrust clearance, mounted together in one body, an effect that the members relating to the capstan can be regulated simply with a high precision and that they can be easily assembled can be obtained.

According to the sixth feature of this invention, since an FF/REW roller link plate is disposed movably in the direction of its length between the tape path and the cassette loading position, FF/REW rollers being disposed at the two extremities of the FF/REW roller link plate so as to be linked with each other movably synchronously to its tape drawing out position and to its retreated position; and the FF/REW roller link plate is coupled with a driving source, which is common also to the loading block, the subblock, the capstan, and the pinch roller, the FF/REW rollers can be surely operated, by utilizing a driving source in common with other members, an effect to make the tape player further smaller can be obtained.

According to the seventh feature of this invention, since a drum base is disposed under the tape path and on the drum base are formed a plurality of rotating drum mounting surfaces, a plurality of guide rail mounting surfaces for the loading block and the subblock, a loading block positioning surface, a plurality of guide post shafts for the tape, and a plurality of loading gear guide roller shafts, an effect that the members related to the forming of the tape path can be precisely and easily positioned is obtained.

According to the eighth feature of this invention, since, in addition to the seventh feature of this invention, a holder arm shaft serving as the rotation center for the holder arm is provided, and further according to the ninth feature of this invention, since, in addition to the seventh feature of this invention, a capstan housing mounting surface is disposed on the drum base, an effect that members playing an important role for constituting the tape path can be positioned in an easier manner is obtained.

The embodiments of the invention in which an exclusive property or privilege is claimed are defined as follows.

1. A tape loading mechanism comprising:
   a rotating drum head;
   a stationary guide rail supported adjacent said drum head and having therein a guide groove;
   a rotatable drive gear;
   a ring-shaped loading gear which extends around said drum head, which is rotatably supported, and which engages said drive gear and is rotated in response to rotation of said drive gear;
   a loading block and a subblock supported in said guide groove of said guide rail for independent movement therealong and each having thereon a post which can engage a tape from a cassette, and means operatively coupling each of said loading block and said subblock to said loading gear for effecting movement of said loading block and said subblock along paths of travel from respective initial positions to respective advanced positions in response to movement of said loading gear, wherein as said loading block and said subblock move to their advanced positions said posts thereon pull the tape into a configuration disposed along a tape path extending partway around said drum head;
   a movable rack member having a rack thereon and means for effecting movement of said rack member with said subblock;
   a holder arm which has a tape guide roller rotatably supported at one end thereof and which is supported at a location spaced from said one end thereof for pivotal movement between advanced and retreated positions in which, when said loading block and said subblock are in their advanced positions, said guide roller is respectively at first and second locations in which it respectively engages and is spaced form a tape extending along said tape path, said first and second locations respectively being disposed along and spaced from said path of travel of said subblock;
   a further gear which is rotatably supported and is engageable with said rack on said rack member, said further gear being rotated by said rack in response to movement of said rack after said subblock has passed said first location; and
   holder arm operating means responsive to rotation of said further gear by said rack for effecting movement of said holder arm from said retreated position thereof to said advanced position thereof.

2. A tape loading mechanism according to claim 1, including holder arm stopper means for preventing pivotal movement of said holder arm past said advanced position thereof; and
   wherein said holder arm operating means includes: a projection provided on said further gear at a location offset radially from an axis of rotation thereof; a first holder arm operating member engaging said projection on said further gear and moved in a direction of movement by said projection in response to rotation of said further gear; a second holder arm operating member coupled at one end thereof a to said holder arm and movable independently of and in substantially the same direction as said first holder arm operating member; and a spring having ends respectively coupled to said first and second holder arm operating members, wherein as said projection on said further gear moves said first holder arm operating member in said direction of movement said second holder arm operating member is moved approximately in said direction of movement by said spring and moves said holder arm away from its initial position until said holder arm stopper means stops movement of said holder arm and said second holder arm operating member when said holder arm reaches its advanced position, further movement thereafter of said further gear by said loading gear causing said first holder arm operating member to move relative to said second holder arm operating member and tension said spring so that said spring yieldably urges further movement of said second holder arm operating member in said direction of movement and thus yieldably urges said holder arm against said holder arm stopper means.

3. A tape loading mechanism according to claim 2, wherein said first holder arm operating member has therein a slot which extends approximately perpendicular to said direction of movement thereof and which slidably receives said projection on said further gear; wherein said second holder arm operating member has therein a slot which extends approximately perpendicular to its direction of movement; wherein said holder arm has at a location spaced form a pivot axis thereof a rotatably supported roller which is disposed in said slot in said second holder arm operating member; and wherein said spring is a helical expansion spring and extends from said first holder arm operating member to said second holder arm operating member substantially opposite said direction of movement of said first holder arm operating member.

4. A tape loading mechanism according to claim 1, including:
   an engaging portion provided on said subblock; and
   a stationary subblock stopper member having a portion which can engage said engaging portion on said subblock to prevent movement of said subblock past said advanced position thereof, said subblock stopper member further having thereon a holder arm stopper which can engage said holder arm to prevent movement of said holder arm past said advanced position of said holder arm.

5. A tape loading mechanism according to claim 1, wherein said means for effecting movement of said rack member with said subblock includes a slot provided in one of said rack member and subblock and extending substantially in the direction of movement thereof, a pin which is provided on the other thereof and is slidably disposed in said slot, and a spring which has its ends respectively supported on said rack member and said subblock and which yieldably urges movement of said subblock in a direction toward said advanced position thereof relative to said rack member, said relative movement being limited by engagement of said pin with an end of said slot.

* * * * *

UNITED STATES PATENT AND TRADEMARK OFFICE
CERTIFICATE OF CORRECTION

PATENT NO. : 4 841 392

DATED : June 20, 1989

INVENTOR(S) : Hidenori MURAMATSU et al

It is certified that error appears in the above-identified patent and that said Letters Patent is hereby corrected as shown below:

Column 18, line 46; change "form" to ---from---.

Column 19, line 3; delete "a".

Column 20, line 1; change "form" to ---from---.

Signed and Sealed this

Thirtieth Day of April, 1991

Attest:

HARRY F. MANBECK, JR.

Attesting Officer

Commissioner of Patents and Trademarks